United States Patent
Sunaoshi et al.

(10) Patent No.: US 12,258,480 B2
(45) Date of Patent: Mar. 25, 2025

(54) AQUEOUS INKJET INK, AQUEOUS INKJET INK SET, AQUEOUS INKJET INK PRINTED MATTER PRODUCTION METHOD, AND PRINTED MATTER

(71) Applicants: artience Co., Ltd., Tokyo (JP); TOYOCOLOR CO., LTD., Tokyo (JP)

(72) Inventors: Kazushi Sunaoshi, Tokyo (JP); Masahiro Sugihara, Tokyo (JP); Yuki Sasaki, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 789 days.

(21) Appl. No.: 17/605,159

(22) PCT Filed: Apr. 21, 2020

(86) PCT No.: PCT/JP2020/017174
§ 371 (c)(1),
(2) Date: Oct. 20, 2021

(87) PCT Pub. No.: WO2020/218287
PCT Pub. Date: Oct. 29, 2020

(65) Prior Publication Data
US 2022/0195223 A1 Jun. 23, 2022

(30) Foreign Application Priority Data
Apr. 23, 2019 (JP) ................................ 2019-082220

(51) Int. Cl.
| | | |
|---|---|---|
| C09D 11/00 | (2014.01) | |
| B41M 5/00 | (2006.01) | |
| C09D 11/033 | (2014.01) | |
| C09D 11/037 | (2014.01) | |
| C09D 11/107 | (2014.01) | |
| C09D 11/38 | (2014.01) | |

(52) U.S. Cl.
CPC ......... *C09D 11/107* (2013.01); *B41M 5/0023* (2013.01); *C09D 11/033* (2013.01); *C09D 11/037* (2013.01); *C09D 11/38* (2013.01)

(58) Field of Classification Search
CPC ... C09D 11/107; C09D 11/033; C09D 11/037; C09D 11/38; B41M 5/0023
USPC ........ 106/31.01, 31.13, 31.6, 31.86
See application file for complete search history.

(56) References Cited

U.S. PATENT DOCUMENTS

| | | |
|---|---|---|
| 2005/0252418 A1 | 11/2005 | Hoshida et al. |
| 2012/0050384 A1 | 3/2012 | Nishiguchi et al. |
| 2013/0155143 A1 | 6/2013 | Ozawa |
| 2013/0208045 A1 | 8/2013 | Shimohara et al. |
| 2014/0313268 A1 | 10/2014 | Nakano et al. |
| 2018/0030298 A1 | 2/2018 | Yamazaki et al. |
| 2019/0105902 A1 | 4/2019 | Mizutani et al. |
| 2020/0199387 A1 | 6/2020 | Utsugi et al. |

FOREIGN PATENT DOCUMENTS

| | | | |
|---|---|---|---|
| JP | 07-224240 | A | 8/1995 |
| JP | 2000191974 | A * | 7/2000 |
| JP | 2003-012744 | A | 1/2003 |
| JP | 2004-051963 | A | 2/2004 |
| JP | 2006-342294 | A | 12/2006 |
| JP | 2008-208153 | A | 9/2008 |
| JP | 2011-74318 | A | 4/2011 |
| JP | 2011-74320 | A | 4/2011 |
| JP | 2012-072357 | A | 4/2012 |
| JP | 2013-001755 | A | 1/2013 |
| JP | 2013-124335 | A | 6/2013 |
| JP | 2013-159619 | A | 8/2013 |
| JP | 2013-163788 | A | 8/2013 |
| JP | 2013-189598 | A | 9/2013 |
| JP | 2014-507305 | A | 3/2014 |
| JP | 2016-176016 | A | 10/2016 |
| JP | 2016-216619 | A | 12/2016 |
| JP | 2018-083930 | A | 5/2018 |
| JP | 2018-203802 | A | 12/2018 |
| WO | 2015/129744 | A1 | 9/2015 |

(Continued)

OTHER PUBLICATIONS

International Search Report for PCT/JP2020/017174 for Jul. 14, 2020 [PCT/ISA/210].

(Continued)

*Primary Examiner* — James E McDonough
(74) *Attorney, Agent, or Firm* — Sughrue Mion, PLLC

(57) ABSTRACT

An aqueous inkjet ink containing a pigment, a binder resin, a water-soluble organic solvent, a surfactant and water, wherein the binder resin contains, as structural units, an aqueous resin containing a structure derived from an ethylenically unsaturated monomer containing an acid group and a structure derived from an ethylenically unsaturated monomer containing a hydroxyl group, the resin has a weight average molecular weight of 5,000 to 45,000, and a glass transition temperature of 35 to 110° C., the water-soluble organic solvent contains a first water-soluble organic solvent having an SP value of 8.5 to 13 $(cal/cm^3)^{1/2}$, and does not contain a second water-soluble organic solvent having a boiling point at 1 atmosphere of 235° C. or higher, and the surfactant contains an acetylene-based surfactant.

17 Claims, No Drawings

(56) References Cited

FOREIGN PATENT DOCUMENTS

WO      2018/235609 A1   12/2018
WO   WO-2018221045 A1 * 12/2018  ............... B41J 2/01

OTHER PUBLICATIONS

Written Opinion for PCT/JP2020/017174 for Jul. 14, 2020 [PCT/ISA/237].
Notice of Reasons for Refusal for Japanese Patent Application No. 2019-082220 dated Feb. 17, 2020.
Extended European Search Report dated May 6, 2022 in European Application No. 20794936.3.
Communication dated May 10, 2023 from the European Patent Office in Application No. 20 794 936.3.
Communication dated Jul. 12, 2022 from the Chinese Patent Office in Chinese Application No. 202080030147.9.

\* cited by examiner

AQUEOUS INKJET INK, AQUEOUS INKJET INK SET, AQUEOUS INKJET INK PRINTED MATTER PRODUCTION METHOD, AND PRINTED MATTER

CROSS REFERENCE TO RELATED APPLICATIONS

This application is a National Stage of International Application No. PCT/JP2020/017174 filed Apr. 21, 2020, claiming priority based on Japanese Patent Application No. 2019-082220 filed Apr. 23, 2019.

TECHNICAL FIELD

The present invention relates to an aqueous inkjet ink (hereinafter also referred to simply as an "aqueous ink" or an "ink"), an aqueous inkjet ink set, a method for producing an aqueous inkjet ink printed matter, and printed matter.

BACKGROUND ART

The spread of digital printing methods is rapidly advancing in line with the trend toward smaller printing lots and diversified needs. The digital printing method does not require a printing plate, and can therefore realize small lot printing, cost reduction, and reduction in the size of the printing apparatus.

The inkjet printing method, which is one type of a digital printing method, is a method in which fine liquid droplets of an ink are jetted from an inkjet head onto a recording medium to form images or text on the recording medium (hereinafter also collectively referred to as "printed matter"). Compared with other digital printing methods, the inkjet printing method is superior in terms of the size and cost of the printing apparatus, the running costs during printing, and the easiness of full-color printing, and, in recent years, the use of the inkjet printing method has been advanced in industrial printing applications.

There are various types of inks used in the inkjet printing method, including oil-based inks, solvent-based inks, active energy ray-curable inks, and aqueous inks. To date, solvent-based inks and active energy ray-curable inks have been used in industrial printing applications. However, as a result of considering and addressing potential harm to people and environment in recent years, the demand for aqueous inks is growing.

Further, in recent years, in the demand for expansion in potential applications of the inkjet printing method, in addition to industrial printing applications, development to packaging applications such as paper containers, labels, and packaging films is demanded. In this case, it is required to form a printed matter having high color reproducibility and high image quality and having properties that can withstand actual use, with respect to low-absorption substrates such as coated paper and art paper, and non-absorption substrates such as polypropylene films (for example, biaxially oriented polypropylene (OPP) films), polyethylene terephthalate (PET) films and nylon films.

Most of the existing aqueous inks for the use in the inkjet printing method (in this description, simply referred to as "aqueous inkjet ink") are inks for forming an image on high-absorption substrate, such as plain paper or special paper. When such an ink is used for a non-absorption substrate, a problem arises in that drying by penetration and absorption of the ink droplets after landing does not occur, and thus print image quality is deteriorated or sufficient adhesion is not obtained.

In particular, if the adhesion to the non-absorption substrate is insufficient, then problems arise, including detachment of the ink film as result of rubbing or the like, and occurrence of blocking due to pressure applied to the printed surface when the printed matter is stored in a wound or stacked state. In addition, in those cases where a printed matter is bonded to another film (lamination) via an adhesive (a laminate adhesive), if the printed matter that has not been sufficiently dried is laminated, then there is a possibility that delamination may occur between the layers due to insufficient laminate strength.

For example, Patent Document 1 discloses an aqueous inkjet ink in which a resin having a specific characteristic and an organic solvent having a specific structure are used in combination, and describes that the aqueous inkjet ink can be suitably used for inkjet printing on a non-absorption substrate such as a polyvinyl chloride sheet. However, as described below, the inventors of the present application evaluated the ink using the resin specifically described in the Examples of Patent Document 1, and it was found that the discharge stability was inferior. In recent years, in order to meet the market demand for the development to the above-mentioned applications, studies have been made to increase the resolution of printed matter by reducing the size of ink droplets discharged from an inkjet head or increasing the driving frequency of the inkjet head, and it can be said that improvement of discharge stability is an essential problem.

Patent Document 2 discloses that a printed matter having excellent lamination applicability can be obtained by using an aqueous inkjet ink containing a certain amount of a water-soluble urethane resin produced through a specific process. However, Patent Document 2 discloses that it is preferable that the glass transition temperature of the water-soluble urethane resin is not high, and the glass transition temperature of the water-soluble urethane resins specifically produced in the Examples is from −50 to −15° C. When an ink containing a resin having such a glass transition temperature is used, there is a high possibility that blocking may occur in the printed matter.

The applicant of the present application has previously proposed an aqueous inkjet ink that contains a (styrene) (meth)acrylic resin having a specific configuration and that is excellent in discharge stability and in image quality with respect to a non-absorption substrate (see Patent Document 3). However, there is a possibility that the laminate strength of the printed matter may be insufficient when this ink is used, and, therefore, improvement is necessary in consideration of the development to the package applications.

As described above, there currently does not exist an aqueous inkjet ink which exhibits high drying properties even when used in printing on a non-absorption substrate, and exhibits excellent discharge stability, and with which a printed matter having excellent blocking resistance and excellent lamination applicability can be obtained.

PRIOR ART DOCUMENTS

Patent Documents

Patent Document 1: JP 2013-159619 A
Patent Document 2: JP 2013-1755 A
Patent Document 3: JP 2018-203802 A

SUMMARY OF INVENTION

Problems Invention Aims to Solve

The present invention has been made to address the above described problems, and an object of the present invention is to provide an aqueous inkjet ink which can exhibit high drying properties even when used in printing on a non-absorption substrate such as an OPP film, a PET film or a nylon film, and can exhibit excellent stability of discharge through inkjet nozzles, and with which a printed matter having excellent blocking resistance and excellent lamination applicability can be obtained.

Means for Solution of the Problems

As a result of intensive investigation, the inventors of the present invention discovered that aqueous inkjets ink having the following configurations were able to achieve the object described above.

In other words, one embodiment of the present invention relates to an aqueous inkjet ink containing a pigment, a binder resin, a water-soluble organic solvent, a surfactant and water, wherein
the binder resin contains an aqueous resin containing, as structural units, a structure derived from an ethylenically unsaturated monomer containing an acid group and a structure derived from an ethylenically unsaturated monomer containing a hydroxyl group;
the resin has a weight average molecular weight of 5,000 to 45,000 and a glass transition temperature of 35 to 110° C.;
the water-soluble organic solvent contains a first water-soluble organic solvent having an SP value of 8.5 to 13 $(cal/cm^3)^{1/2}$, and does not contain a second water-soluble organic solvent having a boiling point at 1 atmosphere of 235° C. or higher; and
the surfactant contains an acetylene-based surfactant.

Another embodiment of the present invention relates to an aqueous inkjet ink containing a pigment, a binder resin, a water-soluble organic solvent, a surfactant and water, wherein
the binder resin contains an aqueous resin containing, as structural units, a structure derived from an ethylenically unsaturated monomer containing an acid group, and a structure derived from an ethylenically unsaturated monomer containing a hydroxyl group;
the resin has a weight average molecular weight of 5,000 to 45,000, and a glass transition temperature of 35 to 110° C.;
the water-soluble organic solvent contains a first water-soluble organic solvent having an SP value of 8.5 to 13 $(cal/cm^3)^{1/2}$, and a second water-soluble organic solvent having a boiling point at 1 atmosphere of 235° C. or higher;
the amount of the second water-soluble organic solvent is greater than 0% by mass but not more than 5% by mass relative to the total mass of the aqueous inkjet ink; and
the surfactant contains an acetylene-based surfactant.

Another embodiment of the present invention is an aqueous inkjet ink set including two or more aqueous inkjet inks having different hues from each other, wherein each of the two or more aqueous inkjet inks is the aqueous inkjet ink as described above.

Another embodiment of the present invention relates to a method for producing an aqueous inkjet ink printed matter, the method having a step of discharging from an inkjet head and adhering to a substrate the aqueous inkjet ink described above or the aqueous inkjet ink set described above, and a step of drying the substrate with the adhered aqueous inkjet ink.

Another embodiment of the present invention relates to a printed matter obtained by printing the aqueous inkjet ink described above or the aqueous inkjet ink set described above onto a substrate.

Effects of the Invention

Embodiments of the present invention are able to provide an aqueous inkjet ink which can exhibit high drying properties even when used in printing on a non-absorption substrate such as an OPP film, a PET film, or a nylon film, and can exhibit excellent stability of discharge through inkjet nozzles, and with which a printed matter having excellent blocking resistance and excellent lamination applicability can be obtained.

EMBODIMENTS FOR CARRYING OUT THE INVENTION

An aqueous inkjet ink according to the present invention is described below using preferred embodiments.

Embodiments of the present invention are as follows.

[1] An aqueous inkjet ink containing a pigment, a binder resin, a water-soluble organic solvent, a surfactant and water, wherein the binder resin contains an aqueous resin containing, as structural units, a structure derived from an ethylenically unsaturated monomer containing an acid group and a structure derived from an ethylenically unsaturated monomer containing a hydroxyl group;
the resin has a weight average molecular weight of 5,000 to 45,000, and a glass transition temperature of 35 to 110° C.;
the water-soluble organic solvent contains a first water-soluble organic solvent having an SP value of 8.5 to 13 $(cal/cm^3)^{1/2}$, and does not contain a second water-soluble organic solvent having a boiling point at 1 atmosphere of 235° C. or higher; and the surfactant contains an acetylene-based surfactant.

[2] The aqueous inkjet ink according to [1], wherein the water-soluble organic solvent contains a water-soluble organic solvent having a boiling point of 200° C. or lower in an amount of at least 60% by mass of the total mass of the water-soluble organic solvent.

[3] An aqueous inkjet ink containing a pigment, a binder resin, a water-soluble organic solvent, a surfactant and water, wherein
the binder resin contains an aqueous resin containing, as structural units, a structure derived from an ethylenically unsaturated monomer containing an acid group and a structure derived from an ethylenically unsaturated monomer containing a hydroxyl group;
the resin has a weight average molecular weight of 5,000 to 45,000, and a glass transition temperature of 35 to 110° C.;
the water-soluble organic solvent contains a first water-soluble organic solvent having an SP value of 8.5 to 13 $(cal/cm^3)^{1/2}$, and a second water-soluble organic solvent having a boiling point at 1 atmosphere of 235° C. or higher;

the amount of the second water-soluble organic solvent is greater than 0% by mass but not more than 5% by mass relative to the total mass of the aqueous inkjet ink; and the surfactant contains an acetylene-based surfactant.

[4] The aqueous inkjet ink according to any one of [1] to [3], wherein the first water-soluble organic solvent contains at least one selected from the group consisting of 1,2-propanediol and 1,2-butanediol in an amount of 5 to 30% by mass relative the total mass of the aqueous inkjet ink.

[5] The aqueous inkjet ink according to any one of [1] to [4], wherein the first water-soluble organic solvent contains one or more propylene glycol ether-based solvents selected from the group consisting of propylene glycol monomethyl ether, propylene glycol monoethyl ether, propylene glycol monopropyl ether, propylene glycol monobutyl ether, and dipropylene glycol monomethyl ether, in an amount of 1 to 15% by mass relative to the total mass of the aqueous inkjet ink.

[6] The aqueous inkjet ink according to any one of [1] to [5], wherein the acid value of the aqueous resin is from 10 to 60 mgKOH/g.

[7] The aqueous inkjet ink according to any one of [1] to [6], wherein the hydroxyl value of the aqueous resin is from 1 to 50 mgKOH/g.

[8] An aqueous inkjet ink set including two or more aqueous inkjet inks having different hues from each other, wherein each of the two or more aqueous inkjet inks is the aqueous inkjet ink according to any one of [1] to [7].

[9] A method for producing an aqueous inkjet ink printed matter, the method having a step of discharging from an inkjet head and adhering to a substrate the aqueous inkjet ink according to any one of [1] to [7] or the aqueous inkjet ink set according to [8], and a step of drying the substrate with the adhered aqueous inkjet ink.

[10] A printed matter obtained by printing the aqueous inkjet ink according to in any one of [1] to [7] or the aqueous inkjet ink set according to [8] onto a substrate.

As described in the Background Art, in general, in non-absorption substrates such as OPP films, PET films, and nylon films, penetration of an aqueous medium (a medium composed of a liquid containing at least water) contained in the ink applied to the substrate does not occur, and the drying properties of such non-adsorbent substrates are greatly inferior to that of the absorbing substrates. Further, there is a possibility that blocking may occur, and, when laminated, delamination may occur.

As is done in Patent Documents 1 and 2, it is common to add a binder resin to the ink as a measure for preventing blocking of the printed matter and increasing the laminate strength. In general, the use of a binder resin having a high glass transition temperature (Tg) improves the blocking resistance of the printed matter. However, since a printed matter containing a binder resin having a high Tg has poor flexibility, it is difficult to sufficiently increase the laminate strength. On the other hand, if the Tg of the binder resin is lowered to give flexibility to the printed matter in order to increase the laminate strength, then there is a possibility that the blocking resistance may be deteriorated.

If a resin having a large weight-average molecular weight is used as the binder resin, a combination of blocking resistance and laminate strength may be able to be achieved. However, there is a possibility that a resin having a large weight-average molecular weight may significantly deteriorate ink discharge stability. In particular, when it is used together with a low boiling point water-soluble organic solvent in order to enhance the drying properties in the use with the non-absorption substrate, there is a high possibility that the ink viscosity may rise sharply at the gas-liquid interface of nozzles and the nozzles may be blocked by the precipitation of the binder resin, thereby deteriorating the discharge stability. On the other hand, if a resin having a small weight-average molecular weight is used as the binder resin, it is difficult to improve blocking resistance and laminate strength because of the low cohesive force of the binder resin.

As a result of intensive investigation aimed at addressing the trade-off described above, the inventors of the present invention discovered that when using a water-soluble binder resin having an acid group and a hydroxyl group, and also having a molecular weight in a specific range, and a glass transition temperature in a specific range, an inkjet ink satisfying the above quality were able to be obtained, thus enabling the inventors to complete embodiments of the present invention. Although the detailed mechanism is unclear, for example, it is surmised as follows.

The binder resin contained in the ink of an embodiment of the present invention contains an aqueous resin (A) containing a structural unit having a specific structure, and having a weight average molecular weight (Mw) of 5,000 to 45,000 and a glass transition temperature (Tg) of 35 to 110° C. By setting the weight-average molecular weight within the above range and making the resin aqueous, the discharge stability is ensured. By setting the glass transition temperature within the above range, the blocking resistance of the printed matter is enhanced. In order to make the resin (A) aqueous, the resin (A) is configured to contain a structure derived from an ethylenically unsaturated monomer (a1) containing an acid group as an essential structural unit. Generally, the introduction of an ethylene oxide group is known as a method for making a resin aqueous. In an embodiment of the present invention, by using an acid group, the blocking resistance and the laminate strength of the printed matter can also be improved.

On the other hand, as described above, simply setting the weight-average molecular weight (Mw) of the resin within the above range and setting the glass transition temperature (Tg) of the resin within the above range, there is a possibility that the printed matter may have poor laminate strength. This is addressed by introducing not only a structure derived from the ethylenically unsaturated monomer (a1) containing an acid group but also a structure derived from the ethylenically unsaturated monomer (a2) containing a hydroxyl group as a structural unit, into the resin (A). Although the detailed reason is unknown, it is thought as follows. Hydroxyl groups do not contain a partial structure corresponding to, for example, a carbonyl group structure present in a carboxylic acid (carboxyl) group or a sulfonyl group structure present in a sulfonic acid group. As a result, it is thought that without being affected by such a partial structure described above, chemical bonds can be formed with polar groups on the non-absorption substrate and with the laminate adhesive, and, as a result, the laminate strength can be rapidly increased.

However, acid groups and hydroxyl groups each form a hydrogen bond with the aqueous medium contained in the ink, so that there is a possibility that the aqueous medium may not dry well. Therefore, in the ink of an embodiment of the present invention, the amount of the water-soluble organic solvent having a boiling point at 1 atmosphere of 235° C. or higher is limited, and the water-soluble organic solvent (B) having an SP value of 8.5 to 13 $(cal/cm^3)^{1/2}$ is used as an essential component.

The SP value (solubility parameter) is a physical property value used to determine the solubility or compatibility of a substance, and, for example, the SP value of water is about 21 $(cal/cm^3)^{1/2}$. Generally, it is said that the closer the SP values are, the higher the compatibility between the substances. As described above, the SP value of the water-soluble organic solvent (B) which is an essential component in an embodiment of the present invention is from 8.5 to 13 $(cal/cm^3)^{1/2}$. It is thought that when the water-soluble organic solvent (B) having such an SP value is used in combination with the aqueous resin (A), the two can be present in the ink without excessive compatibility or repulsion, and separation from the solvent and separation of the resin are promoted after printing, and as a result, drying properties, blocking resistance and lamination applicability are improved.

As described above, in order to obtain an ink that can exhibits the above-described effects, the above-described configuration is indispensable.

Each of the components contained in the ink of embodiments of the present invention is described below.

<Binder Resin>

As described above, the binder resin contained in the ink of an embodiment of the present invention contains an aqueous resin (A) having, as structural units, a structure derived from an ethylenically unsaturated monomer (a1) containing an acid group and a structure derived from an ethylenically unsaturated monomer (a2) containing a hydroxyl group, and having a weight average molecular weight (Mw) of 5,000 to 45,000, and a glass transition temperature (Tg) of 35 to 110° C.

The term "binder resin" as used in this description and the like refers to a resin mainly used for fixing a layer of printing (a printing layer or an ink layer) onto a substrate. As described below, the ink of an embodiment of the present invention may contain a pigment dispersing resin, but the pigment dispersing resin and the binder resin are distinguished by the ratio of adsorption to the pigment. That is, in a pigment dispersion containing a pigment, a resin, and an aqueous medium, and having a pigment concentration of 5% by mass of the total mass of the aqueous medium, and an amount of water of at least 98% by mass of the total mass of the aqueous medium, if the resin has a ratio of adsorption to the pigment of at least 35% by mass, the resin is judged as a pigment dispersing resin, and if the resin has a ratio of adsorption to the pigment of less than 35% by mass, the resin is judged as a binder resin.

The pigment dispersion used for the measurement of the ratio of adsorption can be prepared by, for example, producing a high concentration pigment dispersion having a pigment concentration of 20% by mass by the method described in the Examples described below, and then diluting the dispersion with water until the pigment concentration becomes 5% by mass. The ratio of adsorption can be obtained by, for example, after performing ultracentrifugation (for example, 4 hours at 30,000 rpm) on the pigment dispersion, measuring the amount of the resin contained in the supernatant liquid, and calculating using the following formula (1).

Ratio of Adsorption (%)=($WR1$−$WR2$)×100/$WR1$     Formula (1):

In formula (1), $WR1$ represents the amount (g) of the resin contained in the pigment dispersion before the ultracentrifugation treatment, and $WR2$ represents the amount (g) of the resin contained in the supernatant liquid.

In general, a water-soluble resin, and a hydrosol and an emulsion that are a water-insoluble resin, are known as the forms of resins. Here, the term "water-soluble resin" refers to a resin in which a water mixture of 1% by mass of the subject pigment dispersing resin at 25° C. is transparent to the naked eye. The term "hydrosol" refers to a form in which acidic and/or basic functional groups present in the resin are neutralized and the resin is dispersed in the dispersion medium, and the term "emulsion" refers to a form in which an emulsifier is adsorbed on the surface of the resin fine particles and the resin fine particles are dispersed in the dispersion medium. In an embodiment of the present invention, an aqueous resin, that is, a water-soluble resin or a hydrosol, is used as the resin (A). This type of resin is preferably selected from the viewpoint of suppressing precipitation at the gas-liquid interface of the nozzles and improving discharge stability, since at least a part of the resin is swollen by and/or dissolved in the aqueous medium in the ink.

As the monomer arrangements of copolymers, random copolymers, alternating copolymers, block copolymers, graft copolymers, and the like are known. For the resin (A) in embodiments of the present invention, any of the above forms may be used.

The resin (A) contains, as a structural unit, a structure derived from an ethylenically unsaturated monomer (a1) containing an acid group. Examples of the "acid group" include a carboxylic acid (carboxyl) group, a sulfonic acid group, and a phosphonic acid group, and any of them may be selected in embodiments of the present invention. In particular, it is preferable to select a carboxyl group from the viewpoint of improving discharge stability.

As the ethylenically unsaturated monomer (a1) containing an acid group, known compounds may be used. Specific examples include acrylic acid, methacrylic acid, carboxymethyl (meth)acrylate, carboxyethyl (meth)acrylate, acryloyloxyethyl succinic acid, methacryloyloxyethyl succinic acid, acryloyloxyethyl phthalic acid, methacryloyloxyethyl phthalic acid, acryloyloxyisobutyric acid, methacryloyloxyisobutyric acid, 2-sulfoethyl (meth)acrylate, acryloyloxyethyl phosphonic acid, methacryloyloxyethyl phosphonic acid, 2-(phosphonoxy)ethyl (meth)acrylate, vinylsulfonic acid, styrenecarboxylic acid, styrenesulfonic acid, and styrenephosphonic acid. One of these ethylenically unsaturated monomer (a1) containing an acid group may be used alone or two or more of these monomers may be used. In this description and the like, the term "(meth)acrylate" means at least one selected from among the "acrylate" and the "methacrylate".

The acid value of the resin (A) is preferably from 10 to 60 mgKOH/g, and more preferably from 25 to 45 mgKOH/g, from the viewpoint of improving discharge stability and drying properties.

In this description and the like, the "acid value" means the number of milligrams of potassium hydroxide required to neutralize the acidic component contained in a 1 g sample (mgKOH/g). The acid value of the resin may be calculated from structural units (monomers) that form the resin (for example, in accordance with JIS K0070), or may be measured experimentally. In one example of a method of measuring the acid value experimentally, a solution of the sample is titrated with an ethanolic solution of potassium hydroxide (0.1 mol/L) using an automatic potentiometric titrator AT-710S manufactured by Kyoto Electronics Manufacturing Co., Ltd. After completion of the titration, the acid value is calculated from the amount of the ethanolic solution added to reach the end point.

The resin (A) contains a structure derived from an ethylenically unsaturated monomer (a2) containing a hydroxyl group as a component, in order to improve discharge stability and laminate strength. As described above, it is thought that the hydroxyl group in the monomer (a2) can form a chemical bond with a polar group on a non-absorption substrate or a laminate adhesive, and as a result, the laminate strength can be rapidly increased. In addition, depending on the laminate adhesive to be used, a crosslinked structure is formed with the hydroxyl group, and a very firm laminate can be obtained.

As the ethylenically unsaturated monomer (a2) containing a hydroxyl group, known compounds may be used. Specific examples include hydroxyethyl methacrylate, hydroxyethyl acrylate, and 4-hydroxybutyl acrylate. One of these ethylenically unsaturated monomers (a2) containing a hydroxyl group may be used alone or two or more of these monomers may be used.

The hydroxyl value of the resin (A) is preferably from 1 to 50 mgKOH/g, and more preferably from 15 to 45 mgKOH/g, from the viewpoint of improving discharge stability (initial dischargeability and after-standby-dischargeability), drying properties and laminate strength.

In this description and the like, the "hydroxyl value" means the number of milligrams of potassium hydroxide required for neutralizing acetic acid necessary for acetylating a 1 g sample (mgKOH/g). Similarly to the acid value, the hydroxyl value may be calculated from structural units (monomer) that form the resin (for example, in accordance with JIS K0070), or may be measured experimentally. In one example of a method of measuring the hydroxyl value, the sample is subjected to acetylation by adding an acetylating reagent (a pyridine solution of acetic anhydride (25% by mass)) thereto, and heating, and, thereafter, the resulting mixture is allowed to be cooled, and water is added to hydrolyze the acetic anhydride. Then, as a solvent, ethanol is added, and the sample solution is titrated with an ethanolic solution of potassium hydroxide (0.5 mol/L) using an automatic potentiometric titrator that is described for the acid value. After completion of the titration, the hydroxyl value is calculated from the amount of the ethanolic solution added to reach the end point.

As described above, the hydroxyl group in the monomer (a2) is thought to contribute to the improvement of lamination applicability and discharge stability, but may adversely affect the drying properties of the ink. As a result of intensive studies by the present inventors, it has been found that the state of expression of the above characteristics changes depending on the position of the hydroxyl group in the molecule of the resin (A). Specifically, the average interhydroxyl molecular weight Mdoh represented by formula (2) is preferably from 900 to 6,000, and particularly preferably from 1,200 to 5,000.

$$Mdoh = (\Sigma Wa/\Sigma Wo) \times Ma + 2 \times Mo \quad \text{Formula (2):}$$

In the above formula (2), $\Sigma Wa$ is the sum (% by mass) of the mass fraction of the monomer(s) that form structural units other than the monomer (a2), $\Sigma Wo$ is the sum (% by mass) of the mass fraction of the monomer(s) (a2), Ma is a value represented by the following formula (3), and Mo is a value represented by the following formula (4).

$$Ma = \Sigma(ma \times Wa/\Sigma Wa) \quad \text{Formula (3):}$$

In the above formula (3), ma is the molecular weight of each monomer that forms a structural unit other than the monomer (a2), and Wa is the mass fraction (% by mass) of each monomer that forms a structural unit other than the monomer (a2).

$$Mo = \Sigma(mo \times Wo/\Sigma Wo) \quad \text{Formula (4):}$$

In formula (4), mo is the molecular weight of each monomer (a2), and Wo is the mass fraction (% by mass) of each monomer (a2).

When the resin (A) is a block copolymer, the Mdoh of any block may be within the above range. When the resin (A) is a graft copolymer and only the graft chains contain a hydroxyl group derived from the monomer (a2), the Mdoh of the graft chains may be within the above range.

The resin (A) may contain one or more types of structural unit other than the structure derived from an ethylenically unsaturated monomer (a1) containing an acid group and the structure derived from an ethylenically unsaturated monomer (a2) containing a hydroxyl group (hereinafter also referred to as "other structural unit"). When the resin (A) is a (meth)acrylic-based resin or a styrene (meth)acrylic-based resin, examples of an ethylenically unsaturated monomer that forms this other structural unit include styrene-based monomers such as styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-methoxystyrene, p-phenylstyrene, and p-chlorostyrene;

alkyl group-containing (meth)acrylic-based monomers such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, lauryl (meth)acrylate, myristyl (meth)acrylate, cetyl (meth)acrylate, stearyl (meth)acrylate, arachyl (meth)acrylate, behenyl (meth)acrylate, lignoceryl (meth)acrylate, cerotoyl (meth)acrylate, montanyl (meth)acrylate, melissyl (meth)acrylate, dotriacontanoyl (meth)acrylate, tetratriocontanoyl (meth)acrylate, and hexatriacontanoyl (meth)acrylate;

alkylene oxide chain-containing (meth)acrylic-based monomers such as (poly)ethylene glycol mono(meth)acrylate, (poly)propylene glycol mono(meth)acrylate, (poly)butylene glycol mono(meth)acrylate, (poly)(ethylene glycol-propylene glycol) mono(meth)acrylate, (poly)ethylene glycol mono(meth)acrylate monomethyl ether, (poly)ethylene glycol mono(meth)acrylate monobutyl ether, (poly)ethylene glycol mono(meth)acrylate monooctyl ether, (poly)ethylene glycol mono(meth)acrylate monobenzyl ether, (poly)ethylene glycol mono(meth)acrylate monophenyl ether, (poly)ethylene glycol mono(meth)acrylate monodecyl ether, (poly)ethylene glycol mono(meth)acrylate monododecyl ether, (poly)ethylene glycol mono(meth)acrylate monohexadecyl ether, and (poly)ethylene glycol mono(meth)acrylate monooctadecyl ether;

aromatic ring-containing (meth)acrylic-based monomers such as phenyl (meth)acrylate, benzyl (meth)acrylate, and phenoxyethyl (meth)acrylate;

amino group-containing (meth)acrylic-based monomers such as dimethylaminoethyl (meth)acrylate and diethylaminoethyl (meth)acrylate; and polyfunctional (meth)acrylic-based monomers such as diethylene glycol di(meth)acrylate, triethylene glycol di(meth)acrylate, 1,6-hexanediol di(meth)acrylate, neopentyl glycol di(meth)acrylate, and trimethylolpropane tri(meth)acrylate. The term "(meth) acrylic" means at least one selected from among "acrylic" and "methacrylic".

Among the examples of the ethylenically unsaturated monomer that forms the "other structural unit" as listed above, a monomer having an aromatic ring structure is preferably selected from the viewpoint of achieving excellent discharge stability, and the viewpoint of obtaining a firm coating film, thereby obtaining a printed matter having excellent rubbing resistance and excellent blocking resistance. A styrene-based monomer is particularly preferably selected from the viewpoint of easily setting the weight average molecular weight and the glass transition temperature within the above-mentioned ranges and enabling the effect of an embodiment of the present invention to be achieved more suitably.

The amount of the styrene-based monomer is preferably from 2 to 25% by mass, more preferably from 4 to 20% by mass, and particularly preferably from 5 to 15% by mass, relative to the total monomers that form the resin (A), from the viewpoint of obtaining an ink excellent in discharge stability and excellent in the printed matter's blocking resistance.

As described above, the resin (A) contains an ethylenically unsaturated monomer as a structural unit. Therefore, (meth)acrylic-based resins and styrene (meth)acrylic-based resins are preferably used as the resin (A). In particular, styrene (meth)acrylic-based resins are preferably used from the viewpoint of ensuring the stability of discharge from inkjet nozzles.

The ink of an embodiment of the present invention may contain only the resin (A), or a resin that does not correspond to the resin (A) may be used in combination. In that case, examples of the resin that does not correspond to the resin (A) and that may be used include urethane-based resins, vinyl chloride-based resins, and polyolefin-based resins. Further, the resin that does not correspond to the resin (A) may be an emulsion unless the effect of the embodiment of the present invention is inhibited.

The resin (A) has a weight-average molecular weight (Mw) within a range from 5,000 to 45,000, more preferably within a range from 10,000 to 30,000, from the viewpoint of improving discharge stability by suppressing precipitation and sticking at the nozzles, and also improving blocking resistance and laminate strength, when the resin (A) is combined with a water-soluble organic solvent (B) having an SP value of 8.5 to 13. When the weight-average molecular weight (Mw) is at least 5,000, the blocking resistance and the laminate strength can be sufficiently ensured, and when the weight-average molecular weight (Mw) is not more than 45,000, deterioration of the discharge stability can be suppressed. Further, it is thought that when the resin (A) having the above described weight-average molecular weight is used, molecular motion of the resin (A) in the printing layer may be caused and an interaction with a laminate adhesive or the like may be formed, at the time of lamination or the like, and therefore, the laminate strength can be further improved.

The weight-average molecular weight of the resin (A) can be measured using typical methods. In embodiments of the present invention, the weight average molecular weight of the resin (A) is a value measured as a polystyrene-equivalent weight average molecular weight, using a TSK gel column (manufactured by Tosoh Corporation) and a GPC (HLC-8120GPC, manufactured by Tosoh Corporation) fitted with an RI detector using, using THF as the eluent.

The glass transition temperature (Tg) of the resin (A) is from 35 to 110° C., and more preferably from 50 to 100° C., from the viewpoint of achieving a combination of blocking resistance and laminate strength. When the glass transition temperature is 35° C. or higher, excellent blocking resistance is achieved regardless of the storage environment of the printed matter. When the glass transition temperature is 110° C. or lower, deterioration of the drying properties and the laminate strength is not caused.

The glass transition temperature of the resin (A) is a value obtained by using a DSC (differential scanning calorimeter). Specifically, a dried sample of the resin of about 2 mg is weighed into an aluminum pan, and the aluminum pan is then set in a DSC measuring holder. Thereafter, the temperature of the heat absorption peak read from the chart obtained under the conditions of temperature rising of 5° C./minute is defined as the glass transition temperature in embodiments of the present invention.

The amount of the resin (A), as a non-volatile fraction equivalent amount, in the ink composition is preferably within a range from at least 0.5% by mass to not more than 15% by mass, and more preferably at least 3% by mass but not more than 12% by mass.

<Water-Soluble Organic Solvent>

In an embodiment of the present invention, a water-soluble organic solvent (B) having an SP value of 8.5 to 13 $(cal/cm^3)^{1/2}$ is an essential component, and the amount of the water-soluble organic solvent having a boiling point of 235° C. or higher at 1 atmosphere is from 0 to 5% by mass. In this description and the like, the term "water-soluble organic solvent" refers to a solvent having a solubility in water at 25° C. of 1% by mass or higher, and being liquid at 25° C. In this description and the like, "0% by mass" represent the case where the subject substance (here, a water-soluble organic solvent) is not included. "A water-soluble organic solvent that is the subject substance is included and the amount of the water-soluble organic solvent is from 0 to 5% by mass" represents the case where the amount of the water-soluble organic solvent is more than 0% by mass but not more than 5% by mass.

Although various methods for calculating or actually measuring the SP value have been known so far, in this description and the like, the value at 25° C. calculated by the method described on pages 85 to 86 of "Plastics Materials 6th Edition" (J. A. Brydson, Butterworth-Heinemann, 1995.) is used.

A specific calculation method is described using 1,2-propanediol as an example. The latent heat of evaporation (ΔH) of 1,2-propanediol calculated from the boiling point (188° C.) is 23.7×(188+273)+0.02×(188+273)²−2950≈12232.4 (cal/mol). Using this value, the molecular weight of 1,2-propanediol [76.1 (g/mol)] and the density of 1,2-propanediol [1.04 (g/cm³)], the SP value of the 1,2-propanediol is calculated to be 12.6 $(cal/cm^3)^{1/2}$ from the following formula (5).

$$SP\ value (cal/cm^3)^{1/2} = \{(\Delta H - RT) \div (M \div D)\}^{1/2} \quad \text{Formula (5):}$$

In the above formula (5), ΔH represents the latent heat of evaporation (cal/mol) of the solvent, R represents the gas constant (1.99 cal/K·mol), T represents the temperature (25° C.=298K), M represents the molecular weight (g/mol) of the solvent, and D represents the density (g/cm³) of the solvent.

Examples of the water-soluble organic solvent (B) having an SP value of 8.5 to 13 $(cal/cm^3)^{1/2}$ which may be preferably used in an embodiment of the present invention include monohydric alcohols of 1 to 4 carbon atoms;

1,2-propanediol (SP value: 12.6) and alkanediols of 4 to 6 carbon atoms;

polyalkylene glycols such as diethylene glycol (SP value: 12.2), triethylene glycol (SP value: 11.0), tetraethylene glycol (SP value: 10.2), dipropylene glycol (SP value: 10.2), tripropylene glycol (SP value: 9.0);

ethylene glycol ethers represented by the following general formula (6);

propylene glycol ethers such as propylene glycol monomethyl ether (SP value: 9.5), propylene glycol monoethyl ether (SP value: 9.0), propylene glycol monopropyl ether (SP value: 8.7), propylene glycol monobutyl ether (SP value: 8.5), and dipropylene glycol monomethyl ether (SP value: 8.7);

methoxybutanols such as 3-methoxy-1-butanol (SP value: 9.6) and 3-methoxy-3-methylbutanol (SP value: 9.3);

nitrogen-containing solvents such as N-methylpyrrolidone (SP value: 11.3), 3-methoxy-N,N-dimethylpropanamide (SP value: 9.8), and 3-butoxy-N,N-dimethylpropanamide (SP value: 8.8); and lactone-based solvents such as γ-butyrolactone (SP value: 12.7) and ε-caprolactone (SP value: 11.2).

$$R^2\text{—O-(EO)}_m\text{—H} \qquad \text{General formula (6):}$$

In the above general formula (6), $R^2$ represents an alkyl group of 1 to 4 carbon atoms, and the alkyl group may have a branched chain. EO represents an ethylene oxide group, and m is an integer of 1 to 3.

In an embodiment of the present invention, at least one selected from the group consisting of 1,2-propanediol and 1,2-butanediol is preferably used among the water-soluble organic solvents (B) shown above from the viewpoint of improving discharge stability by suppressing drying and adhesion of the ink on nozzles and also improving drying properties on the non-absorption substrate. Since these water-soluble organic solvents contain many hydroxyl groups, they have high hydrophilicity and can be uniformly present in an aqueous medium. Further, since the SP value of these solvents is from 8.5 to 13 $(cal/cm^3)^{1/2}$, they are not excessively compatible with the resin (A), and they volatilize quickly after printing, thereby enabling the ink having excellent drying properties, blocking resistance and lamination applicability to be obtained. In addition, these solvents have the properties that are less likely to break down the dispersion state of the pigment which is described below, and it is also possible to prevent deterioration of the storage stability of the ink.

When at least one selected from the group consisting of 1,2-propanediol and 1,2-butanediol is used as the water-soluble organic solvent (B), its amount is preferably from 5 to 30% by mass of the total mass of the ink and more preferably from 10 to 25% by mass of the total mass of the ink. When the amount is not more than 30% by mass, the drying properties on the non-absorption substrate can be preferable, and further, a printed matter having excellent blocking resistance and excellent laminate strength can be obtained. As described above, either 1,2-propanediol or 1,2-butanediol may be used alone, or 1,2-propanediol and 1,2-butanediol may be used in combination. The at least one selected from the group consisting of 1,2-propanediol and 1,2-butanediol may also be used with other water-soluble organic solvents exemplified below.

In an embodiment of the present invention, one or more propylene glycol ethers selected from the group consisting of propylene glycol monomethyl ether, propylene glycol monoethyl ether, propylene glycol monopropyl ether, propylene glycol monobutyl ether and dipropylene glycol monomethyl ether are preferably used as the water-soluble organic solvent (B) from the viewpoint of obtaining an ink with particularly excellent drying properties, and from the viewpoint of obtaining a printed matter with excellent blocking resistance by the function of the water-soluble organic solvent (B) as a film-forming assistant of the resin (A).

The amount of the propylene glycol ether as exemplified above is preferably from 1 to 15% by mass and more preferably from 3 to 12% by mass of the total mass of the inkjet ink, from the viewpoint of achieving a combination of improved drying properties on the non-absorption substrate and improved discharge stability by suppressing the adhesion at the nozzle interface. One of the propylene glycol ethers may be used alone or a combination of two or more of the propylene glycol ethers may be used. The propylene glycol ether may be used with 1,2-propanediol and/or 1,2-butanediol, and/or other water-soluble organic solvents exemplified below.

In an embodiment of the present invention, the amount of the water-soluble organic solvent having a boiling point of 235° C. or higher contained in the ink is from 0 to 5% by mass, more preferably from 0 to 2% by mass, from the viewpoint of obtaining the ink having excellent drying properties even on the non-absorption substrate and also having excellent discharge stability. When the amount of the water-soluble organic solvent having a boiling point of 235° C. or higher is from 0 to 5% by mass, it is possible to obtain an ink the adhesion of which on the nozzle can be suppressed, and which also has excellent discharge stability, without impairing the drying properties of the ink even on the non-absorption substrate.

The amount of the water-soluble organic solvent having a boiling point of 235° C. or higher includes the amount of the water-soluble organic solvent (B) having an SP value of 8.5 to 13 $(cal/cm^3)^{1/2}$ and having a boiling point of 235° C. or higher. In this description and the liked, the "boiling point" represents a boiling point at 1 atmosphere, and can be measured using, for example, a thermal analyzer.

Among the water-soluble organic solvents (B) having an SP value of 8.5 to 13 $(cal/cm^3)^{1/2}$, examples of those having a boiling point of 235° C. or higher include 1,5-pentanediol, 3-methyl-1,5-pentanediol, 1,6-hexanediol, diethylene glycol, triethylene glycol, tetraethylene glycol, dipropylene glycol, tripropylene glycol, triethylene glycol monomethyl ether, 3-butoxy-N,N-dimethylpropanamide, and ε-caprolactone. Among solvents that are not the water-soluble organic solvent (B), examples of those having a boiling point of 235° C. or higher include glycerol, diethylene glycol monohexyl ether, tripropylene glycol monomethyl ether, tripropylene glycol monoethyl ether, tripropylene glycol monopropyl ether, tripropylene glycol monobutyl ether, triethylene glycol butyl methyl ether, tetraethylene glycol dimethyl ether, tetraethylene glycol methylethyl ether, tetraethylene glycol butyl methyl ether, and 2-pyrrolidone.

In an embodiment of the present invention, while the blend amount (content) of the water-soluble organic solvent having a boiling point of 235° C. or higher is limited as described above, there no particular limitations on other water-soluble organic solvents, and conventionally known ones can be used. Among the solvents that are not the water-soluble organic solvent (B), examples of the water-soluble organic solvent having a boiling point of lower than 235° C. include, but are not limited to, dipropylene glycol monopropyl ether, dipropylene glycol monobutyl ether, diethylene glycol ethyl methyl ether, diethylene glycol diethyl ether, diethylene glycol butyl methyl ether, triethylene glycol dimethyl ether, propylene glycol dimethyl ether, dipropylene glycol dimethyl ether, and tripropylene glycol dimethyl ether. One of these solvents may be used alone or a combination of two or more solvents may be used.

The total blend amount of the water-soluble organic solvent used in an embodiment of the present invention is preferably from 5 to 40% by mass, relative to the total mass of the ink. In particular, from the viewpoint of ensuring sufficient drying properties even on the non-absorption substrate, the total blend amount of the water-soluble organic solvent is preferably from 10 to 35% by mass.

From the viewpoint of achieving high drying properties, the water-soluble organic solvent in an embodiment of the present invention preferably contains a water-soluble organic solvent having a boiling point of 200° C. or lower in an amount of at least 60% by mass, more preferably at least 80% by mass, particularly preferably 90% by mass or greater, of the total mass of the organic solvent. One water-soluble organic solvent having a boiling point of 200° C. or lower may be used alone, or a combination of two or more water-soluble organic solvent having a boiling point of 200° C. or lower may be used. When the water-soluble organic solvent having a boiling point of 200° C. or lower is used within the above range, since the volatilization speed is high, high drying properties can be achieved. In addition, from the point of view of obtaining an ink having excellent discharge stability, the blend amount of the water-soluble organic solvent having a boiling point of 200° C. or lower is preferably within the above range.

<Pigments>

In the ink of an embodiment of the present invention, either an inorganic pigment or an organic pigment may be used. One of these pigments may be used alone or a combination of two or more pigments may be used. The amount of the pigment is from 0.1 to 20% by mass, preferably from 1 to 10% by mass, and more preferably from 2 to 7% by mass, relative to the total mass of the ink.

When an inorganic pigment is used as the pigment, specific examples include titanium oxide, zinc oxide, zinc sulfide, white lead, calcium carbonate, precipitated barium sulfate, white carbon, alumina white, kaolin clay, talc, bentonite, black iron oxide, cadmium red, red iron oxide, molybdenum red, molybdenum orange, chrome vermillion, chrome yellow, cadmium yellow, yellow iron oxide, titanium yellow, chromium oxide, viridian, titanium cobalt green, cobalt green, cobalt chrome green, Victoria green, ultramarine blue, Prussian blue, cobalt blue, cerulean blue, cobalt silica blue, cobalt zinc silica blue, manganese violet, and cobalt violet.

When an organic pigment is used as the pigment, specific examples include azo pigments, phthalocyanine pigments, anthraquinone pigments, quinacridone pigments, isoindolinone pigments, quinophthalone pigments, dye lake pigments, and fluorescent pigments.

More specifically, listed in terms of their color index values, examples of cyan pigments include C. I. Pigment Blue 1, 2, 3, 15:1, 15:3, 15:4, 15:6, 16, 21, 22, 60 and 64.

Further, examples of magenta pigments include C. I. Pigment Red 5, 7, 9, 12, 31, 48, 49, 52, 53, 57, 97, 112, 120, 122, 146, 147, 149, 150, 168, 170, 177, 178, 179, 184, 188, 202, 206, 207, 209, 238, 242, 254, 255, 264, 269 and 282, and C. I. Pigment Violet 19, 23, 29, 30, 32, 36, 37, 38, 40 and 50.

Further, examples of yellow pigments include C. I. Pigment Yellow 1, 2, 3, 12, 13, 14, 16, 17, 20, 24, 74, 83, 86, 93, 94, 95, 109, 110, 117, 120, 125, 128, 129, 137, 138, 139, 147, 148, 150, 151, 154, 155, 166, 168, 180, 185 and 213.

Examples of black pigments include carbon blacks produced by the furnace method or the channel method. Among these, carbon blacks having properties including a primary particle size of 11 to 40 nm, a specific surface area measured by the BET method of 50 to 400 $m^2/g$, a volatile fraction of 0.5 to 10%, and a pH value of 2 to 10 are preferred. Examples of commercially available products having these types of properties include No. 33, 40, 45, 52, 900, 2200B, 2300, MA7, MA8 and MCF88 (all manufactured by Mitsubishi Chemical Corporation); RAVEN 1255 (manufactured by Birla Carbon); REGAL 330R, 400R and 660R, MOGUL L, and ELFTEX 415 (all manufactured by Cabot Corporation), and NIPex 90, NIPex 150T, NIPex 160IQ, NIPex 170IQ, NIPex 75, PrinteX 35, PrinteX 85, PrinteX 90, PrinteX 95 and PrinteX U (all manufactured by Orion Engineered Carbons). Any of these commercially available products can be used favorably.

Examples of pigments other than those described above include C. I. Pigment Green 7, 10 and 36, C.I. Pigment Brown 3, 5, 25 and 26, and C. I. Pigment Orange 2, 5, 7, 13, 14, 15, 16, 24, 34, 36, 38, 40, 43, 62, 63, 64 and 71.

<Pigment Dispersing Resin>

In order to maintain favorable ink stability over a long period of time, the pigment is used in a dispersed state within the ink. Examples of the method used for stably dispersing and holding a pigment in an ink include (1) a method in which at least a part of the pigment surface is coated with a pigment dispersing resin, (2) a method in which a water-soluble and/or water-dispersible surfactant is adsorbed onto the pigment surface, and (3) a method in which hydrophilic functional groups are chemically and/or physically introduced to the pigment surface and the pigment is dispersed in the ink without a dispersing resin or a surfactant (self-dispersing pigment).

Among the above methods, the method (1), that is, the method using a pigment-dispersing resin, is preferably selected for the ink in an embodiment of the present invention. This is because by selecting and examining the polymerizable monomer composition and the molecular weight of the resin, the ability of coating the pigment of the pigment dispersing resin and the charge of the pigment dispersing resin can be easily adjusted, and as a result, dispersion stability can be imparted even to fine pigments, and further, excellent discharge stability, excellent color development, and a printed matter excellent in color reproducibility can be obtained.

Examples of pigment dispersing resins include (meth)acrylic-based resins, styrene (meth)acrylic-based resins, (anhydrous) maleic acid-based resins, styrene (anhydrous) maleic acid-based resins, α-olefin (anhydrous) maleic acid-based resins, urethane-based resins, and ester-based resins. Among these resins, one or more resins selected from among α-olefin (anhydrous) maleic acid-based resins, (meth)acrylic-based resins, and styrene (meth)acrylic-based resins are preferably used from the viewpoint of strengthening the adsorption to the pigment and stabilizing the pigment dispersion. In this description and the like, the term "(anhydrous) maleic acid" means maleic acid or maleic anhydride.

When a water-soluble resin is used as the pigment dispersing resin, the acid value thereof is preferably from 60 to 400 mgKOH/g. When the acid value is within the above range favorable dispersion stability of the pigment and favorable storage stability of the ink can be achieved. The acid value is more preferably from 120 to 350 mgKOH/g, and still more preferably from 150 to 300 mgKOH/g. On the other hand, when a water-insoluble resin is used as the pigment dispersing resin, the acid value thereof is preferably from 0 to 100 mgKOH/g, more preferably from 5 to 90 mgKOH/g, and still more preferably from 10 to 80 mgKOH/g. When the acid value is within the above range, excellent drying properties can be achieved and a printed matter having excellent blocking resistance can be obtained. The acid value of the pigment-dispersing resin can be measured in the same manner as in the case of the above binder resin.

The weight average molecular weight of the pigment dispersing resin is preferably from 5,000 to 100,000. When the weight-average molecular weight is at least 5,000, favorable dispersion stability of the pigment and favorable storage stability of the ink can be achieved. When the weight-average molecular weight is not more than 100,000, favorable discharge stability can be achieved. The weight average molecular weight is more preferably from 10,000 to 50,000, and still more preferably from 15,000 to 30,000. The weight-average molecular weight of the pigment-dispersing resin can be measured in the same manner as in the case of the above-mentioned binder resin.

The blend amount of the pigment dispersing resin relative to the blend amount of the pigment is preferably from 1 to 100% by mass. When the ratio of the pigment dispersing resin relative to the blend amount of the pigment is at least 1% by mass, favorable viscosity of the ink as an inkjet ink can be achieved, whereas when the ratio is not more than 100% by mass, favorable dispersion stability of the pigment and favorable storage stability of the ink can be achieved. The amount of the pigment dispersing resin relative to the blend amount of the pigment is more preferably from 2 to 50% by mass, and further preferably from 5 to 35% by mass.

<Surfactant>

In the ink of an embodiment of the present invention, a surfactant (hereinafter, may also be simply referred to as "active agent") may be used for the purpose of adjusting the surface tension, and ensuring favorable wettability on the substrate, and particularly on non-absorption substrates. Various types of surfactants such as acetylene-based surfactants, siloxane-based surfactants, acrylic-based surfactants, and fluorine-based surfactants are known in accordance with the intended application. From the viewpoints of satisfactorily lowering the surface tension of the ink and ensuring excellent wettability, the use of at least an acetylene-based surfactant and/or a siloxane-based surfactant is preferred. From the viewpoint of improving lamination applicability, the use of at least an acetylene-based surfactant is particularly preferred. Although the details are unclear, from the viewpoint of obtaining an ink having particularly excellent discharge stability, a both an acetylene-based surfactant and a siloxane-based surfactant are preferably used in combination. Further, it is preferable that in the surfactant a hydrophobic group and a hydrophilic group exist separately in the molecule, and therefore, a surfactant having a hydrophilic ethylene oxide group (for example, ethylene oxide adducts of 2,4,7,9-tetramethyl-5-decine-4,7-diol, ethylene oxide adducts of 2,5,8,11-tetramethyl-6-dodecine-5,8-diol, and siloxane-based surfactants having an ethylene oxide group on the side chains and/or both ends of polydimethylsiloxane chain) can be especially preferably selected.

As an example of the amount added of the surfactant, the amount added of the surfactant is preferably from 0.1 to 5% by mass, and more preferably from 0.2 to 4% by mass, relative to the total mass of the ink.

<Water>

As the water contained in the ink of an embodiment of the present invention, it is preferable to use ion exchange water (deionized water), rather than general water containing various ions.

The amount of water is preferably within a range from 20 to 90% by mass, relative to the total mass of the ink.

<Other Components>

In an embodiment of the present invention, in order to obtain an ink having certain desired physical property values, additives such as antifoaming agents and preservatives may be added as needed, besides the various components described above. The amount added of these additives is preferably at least 0.01% by mass, but not more than 10% by mass, relative to the total weight of the ink.

<Method for Producing Ink>

Examples of methods for preparing an ink of an embodiment of the present invention containing the components described above includes the following methods, but the methods are not limited to these particular methods.

First, a pigment, and, if necessary, a water-soluble organic solvent are added to an aqueous medium (hereinafter sometimes referred to as "aqueous solution") in which at least a pigment dispersant (for example, a pigment dispersing resin) and water are mixed, the resulting mixture is mixed and stirred (premixed), and, thereafter, by performing a dispersion treatment using a dispersion device described below, and, if necessary, performing a centrifugation treatment, a pigment dispersion is obtained. Next, if necessary, the resin (A), the water-soluble organic solvent (B) and, if necessary, any other components as described above are appropriately added to the pigment dispersion, and after thoroughly stirring and mixing, the resulting mixture is filtered to obtain an ink of an embodiment of the present invention.

In the method for preparing an ink described above, it is effective to perform premixing before performing dispersion treatment. The premixing operation is preferred because the wettability of the pigment surface can be improved and the adsorption of the pigment dispersant to the pigment surface can be facilitated.

The dispersion device used for dispersing the pigment may be any typically used dispersion device, and examples include a ball mill, a roll mill, a sand mill, a beads mill and a nanomizer. Among these, a beads mill can be used particularly favorably. Examples of the beads mills include SuperMill, Sand Grinder, Agitator Mill, Glen Mill, Dyno-Mill, Pearl Mill and CoBall Mill (all product names).

Because the ink of an embodiment of the present invention is for inkjet use, from the viewpoint of resistance to clogging of nozzles and the like, a pigment having an optimum particle size distribution is preferably used. Examples of methods that may be used for obtaining a pigment having the desired particle size distribution include methods in which the size of the grinding media in the dispersion device such as those described above is reduced, methods in which the filling ratio of the grinding media is increased, methods in which the treatment time is lengthened, methods in which the pigment is classified with a filter, a centrifugal separator or the like after grinding, and combinations of these methods. The particle size distribution of the ink can be measured using, for example, the Microtrack UPAEX 150 manufactured by Nikkiso.

<Ink Set>

The ink of an embodiment of the present invention may be used singly in a single color, but, depending on the intended application, the ink may also be used in an ink set in which two or more different hues are combined. There are no particular limitation on the combination, but by using three colors of cyan, yellow and magenta, a full-color image can be obtained. Further, by also adding a black ink, the level of blackness can be improved, and the legibility of text and the like can be improved. Further, by also adding colors such as orange and green, color reproducibility can be improved. When printing on a printing medium other than a white printing medium, a clear image can be obtained by additionally using a white ink. Alternatively, the ink set may include, as a component, an ink (clear ink) in which a pigment is excluded from the ink according to an embodiment of the present invention, and which is substantially free from a colorant component.

From the viewpoint of obtaining a printed matter having excellent blocking resistance and excellent lamination applicability, it is preferable that all the inks of the ink set contain a binder resin, a water-soluble organic solvent and water, that the binder resin contains an aqueous resin (A) containing, as structural units, a structure derived from an ethylenically unsaturated monomer (a1) containing an acid group and a structure derived from an ethylenically unsaturated monomer (a2) containing a hydroxyl group, having a weight average molecular weight of 5,000 to 45,000, and having a glass transition temperature of 35 to 110° C., that the water-soluble organic solvent contains a water-soluble organic solvent (B) having an SP value of 8.5 to 13 (cal/cm$^3$)$^{1/2}$, and that the amount of a water-soluble organic solvent having a boiling point of 235° C. or higher is from 0 to 5% by mass relative to the total mass of the inkjet ink.

<Ink-Pretreatment Liquid Set>

The aqueous inkjet ink may also be used, in combination with a pretreating liquid containing a coagulant, in the form of an ink-pretreating liquid set. By applying a pretreatment liquid containing a coagulant to the recording medium, a layer (ink aggregation layer) that intentionally causes aggregation of the solid component contained in the ink may be formed. By impacting the ink on the ink aggregation layer, bleeding between ink droplets and color unevenness may be prevented, and the image quality of the printed matter may be remarkably improved. Further, depending on the material used for the pretreatment liquid, the adhesion, blocking resistance, and lamination applicability of the printed matter may also be improved.

In this description and the like, the term "coagulant" means a component contained in an aqueous inkjet ink that can break down the dispersion state of a pigment and cause aggregation, and/or insolubilize the resin (A) to increase the viscosity of the aqueous inkjet ink. From the viewpoint of achieving a marked improvement in the image quality, the coagulant used in the pretreatment liquid that is combined with an ink of an embodiment of the present invention preferably contains one or more selected from among a metal salt and a cationic polymer compound. In particular, from the viewpoint of achieving excellent image quality, it is preferable to use a metal salt as the coagulant, and it is particularly preferable that one or more polyvalent metal salts of a polyvalent metal ion selected from the group consisting of $Ca^{2+}$, $Mg^{2+}$, $Zn^{2+}$ and $Al^{3+}$ are contained. When a metal salt is used as the coagulant, the amount of the metal salt is preferably from 2 to 30% by mass, and particularly preferably from 3 to 25% by mass, relative to the total mass of the pretreatment liquid.

In addition, a water-soluble organic solvent, a surfactant, a pH modifier, an antifoaming agent, a thickener, an antiseptic, and the like may be added to the pretreatment liquid, if necessary. The water-soluble organic solvent and the surfactant that may be used for the pretreatment liquid are the same as those for the ink. When the pretreatment liquid contains a water-soluble organic solvent, the pretreatment liquid preferably contains a water-soluble organic solvent (B) having an SP value of 8.5 to 13 (cal/cm$^3$)$^{1/2}$ from the viewpoint of obtaining a printed matter having excellent drying properties, excellent blocking resistance and excellent lamination applicability. When the pretreatment liquid contains a surfactant, the type of the surfactant contained in the pretreatment liquid and the type of the surfactant contained in the ink are preferably the same from the viewpoint of enhancing the affinity between the ink aggregation layer and the printing layer and obtaining a printed matter excellent in lamination applicability.

<Recording Medium>

As described above, the ink according to an embodiment of the present invention may be particularly suitably used for a non-absorption substrate such as a film. More specifically, polyolefin-based resins such as polyethylene, biaxially oriented polypropylene (OPP), and cast polypropylene (CPP); polyester-based resins such as polyethylene terephthalate (PET), polycarbonate, and polylactic acid; polystyrene-based resins such as polystyrene, AS resins, and ABS resins; polyamide resins such as nylon; chlorine-containing resins such as polyvinyl chloride and polyvinylidene chloride; cellophane; and composite materials thereof, which are film shaped or sheet shaped, may be used. These substrates may have been subjected to surface treatment such as corona treatment or plasma treatment. For improving image quality, these substrate may have been subjected to coating treatment with a urethane-based resin, an acrylic-based resin, an olefin-based resin, a vinyl-based resin, or the like.

<Method for Producing Printed Matter>

The ink in an embodiment of the present invention is used in a printing method in which ink droplets are discharged from nozzles of an inkjet head and applied onto a substrate.

After applying the ink of an embodiment of the present invention to the substrate, the ink on the substrate is preferably dried with a drying mechanism. Examples of drying methods used in the drying mechanism include heat drying methods, hot air drying methods, infrared (for example, infrared rays with a wavelength of 700 to 2500 nm) drying methods, microwave drying methods, and drum drying methods. One of the above drying methods may be used singly, or a plurality of these methods may be used in succession, or may be used simultaneously. For example, when a combination of a heat drying method and a hot air drying method is used, the ink can be dried more rapidly compared with a case in which when either of these method is used alone.

In an embodiment of the present invention, from the viewpoint of improving blocking resistance and lamination applicability of the printed matter and preventing damage to the substrate, the substrate temperature during drying is preferably within the range from (TgA-25) to (TgA+25)° C., when the glass transition temperature of the resin (A) in the ink is TgA. When two or more resins (A) are used, the weight average value of the glass transition temperatures of the respective resins (A) is used as the TgA.

<Coating Treatment>

The printed matter produced by using the ink of an embodiment of the present invention may, if necessary, be subjected to a coating treatment of the printing surface. Specific examples of the coating treatment include coating or printing of a coating composition, lamination using a dry lamination method, a solvent-free lamination method, or an extrusion lamination method, and any one of these techniques may be selected or a combination of a plurality of them may be used.

In those cases where the printed matter is subjected to the coating treatment by coating or printing a coating composition, either a method in which the coating composition is printed on the substrate in a non-contact manner such as inkjet printing or a method in which the coating composition is brought into contact with the substrate and is printed may be adopted as the coating or printing method. When a method in which a coating composition is printed on the substrate in a non-contact manner is selected, it is preferable to use, as the coating composition, an ink (a clear ink) which does not substantially contain a colorant component and in which a pigment is excluded from the ink of an embodiment of the present invention.

When the printed matter is subjected to lamination, the adhesive used for the lamination with a sealant substrate is preferably constituted with a mixture of a polyol component and a polyisocyanate component.

The polyol component is a resin component having a hydroxyl group, and, in view of coatability, wettability to the printed matter interface and penetration, and laminate strength developed after aging, polyurethane resins and polyester resins may be preferably used. In particular, the polyol component preferably contains a polyester polyol in view of the excellent wettability to the interface of the printed matter obtained with a recording liquid set according to an embodiment of the present invention, for example, wettability to the printing layer (printing portion) and the pretreatment liquid layer (non-printing portion), and the excellent laminate strength of the laminated printed matter (laminate). The polyol component may be a single component or a plurality of polyol components may be used in combination.

When the polyisocyanate component reacts with the polyol component to form a urethane bond, the molecular weight of the adhesive layer increases and the laminate strength is improved. In particular, from the viewpoints of compatibility with the polyol component, wettability to the interface of the printed matter obtained by the recording liquid set, and laminate strength of the laminated printed matter (the laminate), the polyisocyanate component preferably contains a polyether-based urethane resin having a isocyanate group terminal. From the same viewpoint as described above, the amount of the polyisocyanate component is preferably from 50 to 80% by mass relative to the polyol component. The polyisocyanate component may be a single component or a plurality of polyisocyanate components may be used in combination.

Examples of the sealant substrate used in the lamination include polypropylene films such as cast polypropylene (CPP) films and polyethylene films such as linear low-density polyethylene (LLDPE) films. A film in which a metal (oxide) vapor deposition layer such as an aluminum oxide vapor deposition layer is formed may be used.

EXAMPLE

The present invention is described below in further detail using a series of examples and comparative examples. In the following description, unless particularly stated otherwise, "parts" and "%" represent "parts by mass" and "% by mass" respectively.

<Production Example of Binder Resin 1>

A reaction container fitted with a gas inlet tube, a thermometer, a condenser and a stirrer was charged with 72.4 parts of 2-butanone, and the container was flushed with nitrogen gas. The inside of the reaction vessel was heated to 80° C., and a mixture containing 4.5 parts of methacrylic acid as an ethylenically unsaturated monomer having an acid group, 5.0 parts of 2-hydroxyethyl methacrylate as an ethylenically unsaturated monomer having a hydroxyl group, 90.5 parts of methyl methacrylate as another ethylenically unsaturated monomer, and 12 parts of V-601 (manufactured by Wako Pure Chemical Industries, Ltd.) that is a polymerization initiator was added dropwise to the container over a period of 2 hours to carry out a polymerization reaction. Following the completion of the dropwise addition, reaction was continued at 80° C. for a further 3 hours, an additional 0.6 parts of V-601 (manufactured by Wako Pure Chemical Industries, Ltd.) was added, and the reaction was continued at 80° C. for a further 2 hours, thus producing a solution of a binder resin 1. Measurement of the weight average molecular weight of the binder resin 1 using a TSK gel column (manufactured by Tosoh Corporation) and a GPC (HLC-8120 GPC, manufactured by Tosoh Corporation) fitted with a RI detector, and using THF as the eluent revealed a weight average molecular weight of about 7,000.

After the solution of the binder resin 1 was cooled to 50° C., 4.7 parts of dimethylaminoethanol was added to neutralize the resin, and 140 parts of water was then added. Thereafter, the obtained mixture was heated to 78° C. or higher, and the 2-butanone was removed by azeotropic distillation with the water to adjust the solid fraction to 30%, thus producing an aqueous solution of the binder resin 1 of a solid fraction of 30%. The acid value and the hydroxyl value of the produced binder resin 1 were calculated using the structural units of the binder resin and were 29.3 (mgKOH/g) and 21.6 (mgKOH/g), respectively. The glass transition temperature (Tg) was measured using DSC (DSC 6000 manufactured by PerkinElmer) and was 103° C.

<Production Examples of Binder Resins 2, 3 and 39>

With the exception of altering the amount of the polymerization initiator V-601 added dropwise to 4, 2 and 1.1 parts respectively, to adjust the weight average molecular weight, respective aqueous solutions of a binder resin 2, a binder resin 3, and a binder resin 39 of a solid fraction of 30% were produced, by the same operation as that of the binder resin 1.

<Production Examples of Binder Resins 4 to 36 and 40 to 46>

With the exception of using the monomers shown in Table 1 as the polymerizable monomers, respective aqueous solutions of binder resins 4 to 36 and 40 to 46 of a solid fraction of 30% were produced by the same operation as that of the binder resin 2. In neutralization, dimethylaminoethanol was added so that the molar number of the amino group of dimethylaminoethanol was equal to the molar number of the carboxyl group of the ethylenically unsaturated monomer having a carboxyl group in the binder resin. Further, since the binder resin 42, in which neither an ethylenically unsaturated monomer having an acid group nor an ethylenically unsaturated monomer having an ethylene oxide group was used, could not be made aqueous, no further evaluation was performed.

<Production Example of Binder Resin 38>

With the exceptions of altering the reaction solvent from 2-butanone to butanol, and altering the reaction temperature to 110° C. in order to adjust the weight average molecular weight, and further altering the amount of the polymerization initiator V-601 to 12 parts, an aqueous solution of a binder resin 38 of a solid fraction of 30% was produced by the same operation as that of the binder resin 1.

<Production Example of Binder Resin 37 (A-B Block Polymer)>

A reaction container fitted with a gas inlet tube, a thermometer, a condenser and a stirrer was charged with 20 parts of toluene, 5.0 parts of methacrylic acid as an ethylenically unsaturated monomer having an acid group and 5.0 parts of methyl methacrylate as another ethylenically unsaturated monomer, and, 0.9 parts of 2,2'-azobisisobutyronitrile and 3.6 parts of 2-(dodecylthiocarbonothioylthio)-isobutyric acid as polymerization initiators. After flushing the inside of the reaction container with nitrogen gas, the temperature of the inside of the reaction container was raised to 75° C. and the polymerization reaction was carried out for 3 hours, thus producing a copolymer (A block) formed with methacrylic acid and methyl methacrylate.

After the completion of the polymerization reaction, the reaction system was cooled to room temperature, and 60 parts of toluene, 5.0 parts of 2-hydroxyethyl methacrylate as an ethylenically unsaturated monomer having a hydroxyl group, and 60 parts of methyl methacrylate, 15 parts of stearyl methacrylate, and 10 parts of styrene as other polymerizable monomers were charged into the reaction vessel. After flushing the inside of the container with nitrogen gas, the temperature was raised to 75° C. and the polymerization reaction was carried out for 3 hours, thus producing a binder resin 37 having an A-B block structure in which a copolymer (block B) formed with 2-hydroxyethyl methacrylate, methyl methacrylate, stearyl methacrylate and styrene is added to the A block.

Then, after the reaction system was cooled to normal temperature, 6.2 parts of dimethylaminoethanol was added to the reaction container for neutralization, and 200 parts of water was then added to the reaction container. Thereafter, the resulting solution was heated, and the toluene was removed by azeotropic distillation with the water. The solid fraction was then adjusted with water to 30%, thus producing an aqueous solution of a binder resin 37.

<Production Example of Binder Resin 47>

With the exception of using the monomers as shown in Table 2 as the polymerizable monomers, an aqueous solution of a binder resin 47 (solid fraction: 30%) was produced in the same manner as the binder resin 37.

<Production Example of Binder Resin 48>

A reaction container fitted with a gas inlet tube, a thermometer, a condenser and a stirrer was charged with 40 parts of ion exchanged water, and, as an emulsifier, 0.2 parts of Aqualon KH-10 (manufactured by DKS Co., Ltd.). On the other hand, separately from the above, 70.5 parts of butyl acrylate, 20 parts of styrene, 53 parts of exchanged water, and 1.8 parts of Aqualon KH-10 (manufactured by DKS Co., Ltd.) as an emulsifier were mixed and stirred with a homomixer to obtain an emulsion.

Five parts of the above described emulsion were taken and added to the reaction container. After the addition, the temperature of the inside of the reaction container was raised to 60° C., and the reaction container was sufficiently flushed with nitrogen. Thereafter, 3 parts of a 5% aqueous solution of potassium persulfate and 4 parts of a 1% aqueous solution of anhydrous sodium bisulfite were added to start polymerization. After the start of the reaction, while maintaining the temperature of the inside of the reaction container at 60° C., the remainder of the above emulsion, 2 parts of a 5% aqueous solution of potassium persulfate, and 6 parts of a 1% aqueous solution of anhydrous sodium bisulfite were added dropwise over 1.5 hours, and stirring was continued for a further 2 hours. After the completion of the reaction, the temperature was cooled to 30° C., and diethylaminoethanol was added to adjust the pH to 8.5. Further, by adjusting the solid fraction to 30% with ion-exchanged water, an aqueous dispersion of a binder resin 48 (solid fraction: 30%) was produced. The weight average molecular weight of the binder resin 48 could not be measured because the binder resin 48 was insoluble in THF that is the eluent. The weight average molecular weight is estimated to be at least 100,000.

<Production Example of Binder Resin 49>

With the exception of using the monomers as shown in Table 3 as the polymerizable monomers, an aqueous dispersion of a binder resin 49 of a solid fraction of 30% was produced by the same operation as that of the binder resin 48. The weight average molecular weight of the binder resin 49 could not be measured because the binder resin 49 was insoluble in THF that is the eluent. The weight average molecular weight is estimated to be at least 100,000.

TABLE 1

| Binder resin (A) | | Resin 1 | Resin 2 | Resin 3 | Resin 4 | Resin 5 | Resin 6 | Resin 7 |
|---|---|---|---|---|---|---|---|---|
| Ethylenically unsaturated monomer (a1) containing acid group | AA | | | | | | | |
| | MAA | 4.5 | 4.5 | 4.5 | 4.5 | 4.5 | 4.5 | 2 |
| | MOEPh | | | | | | | |
| | VSA | | | | | | | |
| Ethylenically unsaturated monomer (a2) containing hydroxyl group | 2HEMA | 5 | 5 | 5 | 5 | 5 | 5 | 2 |
| | 2HEA | | | | | | | |
| | 4HBA | | | | | | | |
| Another ethylenically unsaturated monomer | MMA | 90.5 | 90.5 | 90.5 | 70.5 | 40.5 | 20.5 | 96.0 |
| | BMA | | | | 20 | 50 | 70 | |
| | LMA | | | | | | | |
| | StMA | | | | | | | |
| | 2EHMA | | | | | | | |
| | St | | | | | | | |
| | α MeSt | | | | | | | |
| | PME-400 | | | | | | | |
| Parameter | Total | 100 | 100 | 100 | 100 | 100 | 100 | 100 |
| | Weight average molecular weight (Mw) | 7,000 | 17,900 | 42,000 | 17,400 | 19,100 | 19,101 | 16,800 |
| | Glass transition temperature (Tg) [° C.] | 103 | 103 | 103 | 83 | 56 | 40 | 104 |
| | Acid value [mgKOH/g] | 29.3 | 29.3 | 29.3 | 29.3 | 29.3 | 29.3 | 13.0 |
| | Hydroxyl value [mgKOH/g] | 21.6 | 21.6 | 21.6 | 21.6 | 21.6 | 21.6 | 8.6 |

TABLE 1-continued

| | | | | | | | |
|---|---|---|---|---|---|---|---|
| | Average interhydroxyl molecular weight (Mdoh) | 2,150 | 2,150 | 2,150 | 2,318 | 2,571 | 2,739 | 5,151 |

| Binder resin (A) | | | Resin 8 | Resin 9 | Resin 10 | Resin 11 | Resin 12 |
|---|---|---|---|---|---|---|---|
| Ethylenically unsaturated monomer (a1) containing acid group | AA<br>MAA<br>MOEPh<br>VSA | | 2 | 2 | 4.5 | 4.5 | 4.5 |
| Ethylenically unsaturated monomer (a2) containing hydroxyl group | 2HEMA<br>2HEA<br>4HBA | | 5 | 10 | 0.6 | 2.2 | 9.5 |
| Another ethylenically unsaturated monomer | MMA<br>BMA<br>LMA<br>StMA<br>2EHMA<br>St<br>α MeSt<br>PME-400 | | 93.0 | 88.0 | 94.9 | 93.3 | 86.0 |
| | Total | | 100 | 100 | 100 | 100 | 100 |
| Parameter | Weight average molecular weight (Mw) | | 17,400 | 19,100 | 18,600 | 18,400 | 18,000 |
| | Glass transition temperature (Tg) [° C.] | | 103 | 100 | 106 | 105 | 101 |
| | Acid value [mgKOH/g] | | 13.0 | 13.0 | 29.3 | 29.3 | 29.3 |
| | Hydroxyl value [mgKOH/g] | | 21.6 | 43.1 | 2.2 | 8.6 | 43.1 |
| | Average interhydroxyl molecular weight (Mdoh) | | 2,157 | 1,158 | 16,738 | 4,681 | 1,207 |

| Binder resin (A) | | Resin 13 | Resin 14 | Resin 15 | Resin 16 | Resin 17 | Resin 18 | Resin 19 |
|---|---|---|---|---|---|---|---|---|
| Ethylenically unsaturated monomer (a1) containing acid group | AA<br>MAA<br>MOEPh<br>VSA | 4.5 | 4.5 | 7 | 7 | 7 | 9 | 10 |
| Ethylenically unsaturated monomer (a2) containing hydroxyl group | 2HEMA<br>2HEA<br>4HBA | 15 | 20 | 2 | 5 | 10 | 5 | 5 |
| Another ethylenically unsaturated monomer | MMA<br>BMA<br>LMA<br>StMA<br>2EHMA<br>St<br>α MeSt<br>PME-400 | 80.5 | 75.5 | 91.0 | 88.0 | 83.0 | 86.0 | 85.0 |
| | Total | 100 | 100 | 100 | 100 | 100 | 100 | 100 |
| Parameter | Weight average molecular weight (Mw) | 18,100 | 18,100 | 16,900 | 17,200 | 19,000 | 18,100 | 18,300 |
| | Glass transition temperature (Tg) [° C.] | 98 | 95 | 106 | 104 | 100 | 104 | 105 |
| | Acid value [mgKOH/g] | 29.3 | 29.3 | 45.6 | 45.6 | 45.6 | 58.6 | 65.2 |
| | Hydroxyl value [mgKOH/g] | 64.7 | 86.2 | 8.6 | 21.6 | 43.1 | 21.6 | 21.6 |

TABLE 1-continued

| | | Resin 20 | Resin 21 | Resin 22 | Resin 23 | Resin 24 | Resin 25 | | |
|---|---|---|---|---|---|---|---|---|---|
| | Average interhydroxyl molecular weight (Mdoh) | 823 | 657 | 5,116 | 2,143 | 1,151 | 2,137 | 2,134 | |

| Binder resin (A) | | Resin 20 | Resin 21 | Resin 22 | Resin 23 | Resin 24 | Resin 25 |
|---|---|---|---|---|---|---|---|
| Ethylenically unsaturated monomer (a1) containing acid group | AA | | | 4.5 | | | |
| | MAA | 4.5 | 4.5 | | | | 4.5 |
| | MOEPh | | | | 4.5 | | |
| | VSA | | | | | 4.5 | |
| Ethylenically unsaturated monomer (a2) containing hydroxyl group | 2HEMA | | | 5 | 5 | 5 | 5 |
| | 2HEA | 5 | | | | | |
| | 4HBA | | 5 | | | | |
| Another ethylenically unsaturated monomer | MMA | 90.5 | 90.5 | 90.5 | 90.5 | 90.5 | 70.5 |
| | BMA | | | | | | 20 |
| | LMA | | | | | | |
| | StMA | | | | | | |
| | 2EHMA | | | | | | |
| | St | | | | | | |
| | α MeSt | | | | | | |
| | PME-400 | | | | | | |
| | Total | 100 | 100 | 100 | 100 | 100 | 100 |
| Parameter | Weight average molecular weight (Mw) | 16,500 | 17,000 | 18,400 | 18,400 | 18,400 | 17,800 |
| | Glass transition temperature (Tg) [° C.] | 97 | 89 | 102 | 95 | 96 | 83 |
| | Acid value [mgKOH/g] | 29.3 | 29.3 | 35.0 | 24.0 | 23..4 | 29.3 |
| | Hydroxyl value [mgKOH/g] | 24.2 | 19.5 | 21.6 | 21.6 | 21.6 | 21.6 |
| | Average interhydroxyl molecular weight (Mdoh) | 2,122 | 2,178 | 2,137 | 2,247 | 2,169 | 2,318 |

| Binder resin (A) | | Resin 26 | Resin 27 | Resin 28 | Resin 29 | Resin 30 | Resin 31 | Resin 32 | Resin 33 |
|---|---|---|---|---|---|---|---|---|---|
| Ethylenically unsaturated monomer (a1) containing acid group | AA | | | | | | | | |
| | MAA | 4.5 | 4.5 | 4.5 | 4.5 | 4.5 | 4.5 | 4.5 | 4.5 |
| | MOEPh | | | | | | | | |
| | VSA | | | | | | | | |
| Ethylenically unsaturated monomer (a2) containing hydroxyl group | 2HEMA | 5 | 5 | 5 | 5 | 5 | 5 | 5 | 5 |
| | 2HEA | | | | | | | | |
| | 4HBA | | | | | | | | |
| Another ethylenically unsaturated monomer | MMA | 70.5 | 70.5 | 70.5 | 55.5 | 55.5 | 69.0 | 65.5 | 50.5 |
| | BMA | | | | 20 | | | | |
| | LMA | 20 | | | | 20 | 20 | 20 | 20 |
| | StMA | | 20 | | | | | | |
| | 2EHMA | | | 20 | | | | | |
| | St | | | | 15 | 15 | 1.5 | 5 | 20 |
| | α MeSt | | | | | | | | |
| | PME-400 | | | | | | | | |
| | Total | 100 | 100 | 100 | 100 | 100 | 100 | 100 | 100 |
| Parameter | Weight average molecular weight (Mw) | 18,200 | 18,200 | 18,200 | 18,200 | 17,000 | 17,100 | 17,400 | 16,800 |
| | Glass transition temperature (Tg) [° C.] | 51 | 88 | 73 | 82 | 50 | 51 | 50 | 50 |
| | Acid value [mgKOH/g] | 29.3 | 29.3 | 29.3 | 29.3 | 29.3 | 29.3 | 29.3 | 29.3 |
| | Hydroxyl value [mgKOH/g] | 21.6 | 21.6 | 21.6 | 21.6 | 21.6 | 21.6 | 21.6 | 21.6 |

TABLE 1-continued

| | | | | | | | | |
|---|---|---|---|---|---|---|---|---|
| | Average interhydroxyl molecular weight (Mdoh) | 2,767 | 3,104 | 2,542 | 2,330 | 2,779 | 2,768 | 2,771 | 2,783 |

| Binder resin (A) | | Resin 34 | Resin 35 | Resin 36 | Resin 38 | Resin 39 | Resin 40 | Resin 41 |
|---|---|---|---|---|---|---|---|---|
| Ethylenically unsaturated monomer (a1) containing acid group | AA | | | | | | | |
| | MAA | 4.5 | 4.5 | 4.5 | 4.5 | 4.5 | 4.5 | 4.5 |
| | MOEPh | | | | | | | |
| | VSA | | | | | | | |
| Ethylenically unsaturated monomer (a2) containing hydroxyl group | 2HEMA | 5 | 5 | 5 | 5 | 5 | 5 | 5 |
| | 2HEA | | | | | | | |
| | 4HBA | | | | | | | |
| Another ethylenically unsaturated monomer | MMA | 40.5 | 55.5 | 55.5 | 90.5 | 90.5 | 65.5 | 10.5 |
| | BMA | | | | | | | 80 |
| | LMA | 20 | | | | | | |
| | StMA | | 20 | | | | | |
| | 2EHMA | | | 20 | | | | |
| | St | 30 | 15 | 15 | | | | |
| | α MeSt | | | | | | 25 | |
| | PME-400 | | | | | | | |
| | Total | 100 | 100 | 100 | 100 | 100 | 100 | 100 |
| Parameter | Weight average molecular weight (Mw) | 17,000 | 17,200 | 18,100 | 4,200 | 57,000 | 16,800 | 19,101 |
| | Glass transition temperature (Tg) [° C.] | 50 | 87 | 72 | 103 | 103 | 117 | 33 |
| | Acid value [mgKOH/g] | 29.3 | 29.3 | 29.3 | 29.3 | 29.3 | 29.3 | 29.3 |
| | Hydroxyl value [mgKOH/g] | 21.6 | 21.6 | 21.6 | 21.6 | 21.6 | 21.6 | 21.6 |
| | Average interhydroxyl molecular weight (Mdoh) | 2,791 | 3,116 | 2,555 | 2,150 | 2,150 | 2,240 | 2,823 |

| Binder resin (A) | | Resin 42 | Resin 43 | Resin 44 | Resin 45 | Resin 46 |
|---|---|---|---|---|---|---|
| Ethylenically unsaturated monomer (a1) containing acid group | AA | | | | | |
| | MAA | | | 4.5 | 4.5 | 16 |
| | MOEPh | | | | | |
| | VSA | | | | | |
| Ethylenically unsaturated monomer (a2) containing hydroxyl group | 2HEMA | 5 | 5 | | | 10 |
| | 2HEA | | | | | |
| | 4HBA | | | | | |
| Another ethylenically unsaturated monomer | MMA | 95.0 | 85.0 | 75.5 | 60.5 | |
| | BMA | | | 20 | 20 | |
| | LMA | | | | | |
| | StMA | | | | | |
| | 2EHMA | | | | | 74 |
| | St | | | | 15 | |
| | α MeSt | | | | | |
| | PME-400 | | 10 | | | |
| | Total | 100 | 100 | 100 | 100 | 100 |
| Parameter | Weight average molecular weight (Mw) | 16,800 | 18,400 | 18,200 | 17,600 | 47,000 |
| | Glass transition temperature (Tg) [° C.] | 104 | 98 | 85 | 85 | 12 |
| | Acid value [mgKOH/g] | 0.0 | 0.0 | 29.3 | 29.3 | 104.0 |
| | Hydroxyl value [mgKOH/g] | 21.6 | 21.6 | 0.0 | 0.0 | 43.0 |

TABLE 1-continued

|  |  |  |  |  |  |  |
|---|---|---|---|---|---|---|
| Average interhydroxyl molecular weight (Mdoh) | 2,162 | 2,870 | — | — | 1,865 |

TABLE 2

| Binder resin (A) | | Resin 37 | | Resin 47 | |
|---|---|---|---|---|---|
| | | A Block | B Block | A Block | B Block |
| Ethylenically unsaturated monomer (a1) containing acid group | MAA | 5 | | 5 | |
| Ethylenically unsaturated monomer (a2) containing hydroxyl group | HEMA | | 5 | | |
| Another ethylenically unsaturated monomer | MMA | 5 | 60 | 5 | 65 |
| | StMA | | 15 | | 15 |
| | St | | 10 | | 10 |
| | Total | 100 | | 100 | |
| Parameter | Weight average molecular weight (Mw) | 17,600 | | 17,800 | |
| | Glass transition temperature (Tg) [° C.] | 91 | | 94 | |
| | Acid value [mgKOH/g] | 32.6 | | 29.3 | |
| | Hydroxyl value [mgKOH/g] | 21.6 | | 0.0 | |
| | Average interhydroxyl molecular weight (Mdoh) | — | 2,686 | — | — |

TABLE 3

| Binder resin (A) | | Resin 48 | Resin 49 |
|---|---|---|---|
| Ethylenically unsaturated monomer (a1) containing acid group | MAA | 4.5 | 4.5 |
| Ethylenically unsaturated monomer (a2) containing hydroxyl group | HEMA | 5 | 5 |
| Another ethylenically unsaturated monomer | MMA | | 40.5 |
| | BMA | | 20 |
| | BA | 70.5 | 15 |
| | St | 20 | 15 |
| | Total (monomer) | 100 | 100 |
| Emulsifier | Aqualon KH-10 | 2 | 2 |
| Parameter | Weight average molecular weight (Mw) | Not measurable | Not measurable |
| | Glass transition temperature (Tg) [° C.] | −24 | 49 |
| | Acid value [mgKOH/g] | 29.3 | 29.3 |
| | Hydroxyl value [mgKOH/g] | 21.6 | 21.6 |
| | Average interhydroxyl molecular weight (Mdoh) | 2,562 | 2,415 |

The abbreviations used in Tables 1 to 3 have the following meanings.

AA: acrylic acid
MAA: methacrylic acid
MOEPh: methacryloyloxyethylphosphonic acid
VSA: vinyl sulfonic acid
2HEMA: 2-hydroxyethyl methacrylate
2HEA: 2-hydroxyethyl acrylate
4 HBA: 4-hydroxybutyl acrylate
MMA: methyl methacrylate
BMA: butyl methacrylate
LMA: lauryl methacrylate
StMA: stearyl methacrylate
2EHMA: 2-ethylhexyl methacrylate
St: Styrene
α-MeSt: α-methylstyrene
PME-400: methoxy polyethylene glycol acrylate (EO≈9 mol)
BA: butyl acrylate <Pigment Dispersion: Production Example of Cyan 1>

Fifteen parts of C. I. Pigment Blue 15:3 (Lionol Blue 7358G, manufactured by Toyo Color Co., Ltd.) as a pigment was mixed with 10 parts of an aqueous solution of styrene acrylic resin (molecular weight: 25000, acid value: 200) of a solid fraction of 50% as a pigment dispersing resin, and 70 parts of water, and a preliminary dispersion was performed using a disper mixer. Thereafter, a main dispersion treatment was performed using a Dyno-Mill with a capacity of 0.6 L filled with 1,800 g of zirconia beads of diameter 0.5 mm, thus producing a pigment dispersion (cyan 1).

<Pigment Dispersion: Production Example of Magenta 1>

With the exception of using C. I. Pigment Red 122 (FASTGEN SUPER MAGENTA RGT, manufactured by DIC Corporation), as the pigment, the same method as the cyan 1 was used to obtain a pigment dispersion (magenta 1).

<Production Examples of Inks of Example 1>

First, 30 parts of the cyan 1 as a pigment dispersion, 23.3 parts (7 parts in solid fraction equivalent) of the aqueous solution of the binder resin 1, 25 parts of 1,2-propanediol, 1.5 parts of TEGO WET 280 (polyether-modified siloxane copolymer-based surfactant manufactured by Evonic), and 1 part of Surfinol 465 (acetylene diol-based surfactant, manufactured by Shin-Etsu Chemical Co., Ltd.) were added sequentially to a mixing container, and sufficient water was then added to make the total ink amount up to 100 parts. The resulting mixture was then stirred thoroughly until uniform using a disper mixer. Thereafter, the obtained mixture was filtered through a membrane filter having a pore size of 1 μm to remove coarse particles that can cause head blockages, thus producing an ink (ink 1) of Example 1.

<Production Examples of Inks of Examples 2 to 54 and Comparative Examples 1 to 16>

Using the materials shown in Tables 4 to 5, the same method as the production example for the ink of Example 1 was used to produce the inks of Examples 2 to 54 and Comparative Examples 1 to 16 (inks 2 to 70).

TABLE 4

| | | | Example 1 | Example 2 | Example 3 | Example 4 | Example 5 |
|---|---|---|---|---|---|---|---|
| Aqueous inkjet ink No. | | | Ink 1 | Ink 2 | Ink 3 | Ink 4 | Ink 5 |
| Pigment dispersion (Pigment density 15%) | Pigment dispersion | | Cyan 1 | Cyan 1 | Cyan 1 | Cyan 1 | Cyan 1 |
| | Amount | | 30 | 30 | 30 | 30 | 30 |
| Binder resin | Binder resin | | Resin 1 | Resin 2 | Resin 3 | Resin 4 | Resin 5 |
| | Amount (Solid fraction equivalent) | | 7 | 7 | 7 | 7 | 7 |
| Water-soluble organic solvent | Water-soluble organic solvent (B) | 1,2PD | 25 | 25 | 25 | 25 | 25 |
| Surfactant | Siloxane-based | TEGO WET 280 | 1.5 | 1.5 | 1.5 | 1.5 | 1.5 |
| | Acetylene-based | Surfinol 465 | 1 | 1 | 1 | 1 | 1 |
| Water | | | Rest | Rest | Rest | Rest | Rest |
| Evaluation result | Initial dischargeability | | A | A | A | A | A |
| | After-Standby-dischargeability | | A | A | B | A | A |
| | Blocking resistance | | A | A | A | A | A |
| | Laminate strength: PET/CPP | | A | AA | AA | AA | AA |
| | Laminate strength: OPP/CPP | | A | A | A | A | A |
| | Drying properties | | A | A | A | A | A |

| | | | Example 6 | Example 7 | Example 8 | Example 9 |
|---|---|---|---|---|---|---|
| Aqueous inkjet ink No. | | | Ink 6 | Ink 7 | Ink 8 | Ink 9 |
| Pigment dispersion (Pigment density 15%) | Pigment dispersion | | Cyan 1 | Cyan 1 | Cyan 1 | Cyan 1 |
| | Amount | | 30 | 30 | 30 | 30 |
| Binder resin | Binder resin | | Resin 6 | Resin 7 | Resin 8 | Resin 9 |
| | Amount (Solid fraction equivalent) | | 7 | 7 | 7 | 7 |
| Water-soluble organic solvent | Water-soluble organic solvent (B) | 1,2PD | 25 | 25 | 25 | 25 |
| Surfactant | Siloxane-based | TEGO WET 280 | 1.5 | 1.5 | 1.5 | 1.5 |
| | Acetylene-based | Surfinol 465 | 1 | 1 | 1 | 1 |
| Water | | | Rest | Rest | Rest | Rest |
| Evaluation result | Initial dischargeability | | A | A | A | A |
| | After-Standby-dischargeability | | B | B | B | B |
| | Blocking resistance | | A | A | A | A |
| | Laminate strength: PET/CPP | | A | A | AA | A |
| | Laminate strength: OPP/CPP | | A | A | A | A |
| | Drying properties | | A | A | A | A |

| | | | Example 10 | Example 11 | Example 12 | Example 13 | Example 14 | Example 15 |
|---|---|---|---|---|---|---|---|---|
| Aqueous inkjet ink No. | | | Ink 10 | Ink 11 | Ink 12 | Ink 13 | Ink 14 | Ink 15 |
| Pigment dispersion (Pigment density 15%) | Pigment dispersion | | Cyan 1 | Cyan 1 | Cyan 1 | Cyan 1 | Cyan 1 | Cyan 1 |
| | Amount | | 30 | 30 | 30 | 30 | 30 | 30 |
| Binder resin | Binder resin | | Resin 10 | Resin 11 | Resin 12 | Resin 13 | Resin 14 | Resin 15 |
| | Amount (Solid fraction equivalent) | | 7 | 7 | 7 | 7 | 7 | 7 |
| Water-soluble organic solvent | Water-soluble organic solvent (B) | 1,2PD | 25 | 25 | 25 | 25 | 25 | 25 |
| Surfactant | Siloxane-based | TEGO WET 280 | 1.5 | 1.5 | 1.5 | 1.5 | 1.5 | 1.5 |
| | Acetylene-based | Surfinol 465 | 1 | 1 | 1 | 1 | 1 | 1 |
| Water | | | Rest | Rest | Rest | Rest | Rest | Rest |
| Evaluation result | Initial dischargeability | | A | A | A | B | B | B |
| | After-Standby-dischargeability | | A | A | A | AA | AA | AA |
| | Blocking resistance | | A | A | A | A | A | A |
| | Laminate strength: PET/CPP | | B | A | A | B | B | B |
| | Laminate strength: OPP/CPP | | B | A | A | B | B | B |
| | Drying properties | | A | A | A | B | B | A |

TABLE 4-continued

|  |  |  | Example 16 | Example 17 | Example 18 | Example 19 |  |
|---|---|---|---|---|---|---|---|
|  | Aqueous inkjet ink No. |  | Ink 16 | Ink 17 | Ink 18 | Ink 19 |  |
| Pigment dispersion (Pigment density 15%) | Pigment dispersion | | Cyan 1 | Cyan 1 | Cyan 1 | Cyan 1 | |
| | Amount | | 30 | 30 | 30 | 30 | |
| Binder resin | Binder resin | | Resin 16 | Resin 17 | Resin 18 | Resin 19 | |
| | Amount (Solid fraction equivalent) | | 7 | 7 | 7 | 7 | |
| Water-soluble organic solvent | Water-soluble organic solvent (B) | 1,2PD | 25 | 25 | 25 | 25 | |
| Surfactant | Siloxane-based | TEGO WET 280 | 1.5 | 1.5 | 1.5 | 1.5 | |
| | Acetylene-based | Surfinol 465 | 1 | 1 | 1 | 1 | |
| Water | | | Rest | Rest | Rest | Rest | |
| Evaluation result | Initial dischargeability | | B | B | B | B | |
| | After-Standby-dischargeability | | AA | AA | AA | AA | |
| | Blocking resistance | | A | A | A | B | |
| | Laminate strength: PET/CPP | | A | B | A | B | |
| | Laminate strength: OPP/CPP | | A | B | A | B | |
| | Drying properties | | A | A | A | B | |

|  |  |  | Example 20 | Example 21 | Example 22 | Example 23 | Example 24 |
|---|---|---|---|---|---|---|---|
| Aqueous inkjet ink No. | | | Ink 20 | Ink 21 | Ink 22 | Ink 23 | Ink 24 |
| Pigment dispersion (Pigment density 15%) | Pigment dispersion | | Cyan 1 | Cyan 1 | Cyan 1 | Cyan 1 | Cyan 1 |
| | Amount | | 30 | 30 | 30 | 30 | 30 |
| Binder resin | Binder resin | | Resin 20 | Resin 21 | Resin 22 | Resin 23 | Resin 24 |
| | Amount (Solid fraction equivalent) | | 7 | 7 | 7 | 7 | 7 |
| Water-soluble organic solvent | Water-soluble organic solvent (B) | 1,2PD | 25 | 25 | 25 | 25 | 25 |
| Surfactant | Siloxane-based | TEGO WET 280 | 1.5 | 1.5 | 1.5 | 1.5 | 1.5 |
| | Acetylene-based | Surfinol 465 | 1 | 1 | 1 | 1 | 1 |
| Water | | | Rest | Rest | Rest | Rest | Rest |
| Evaluation result | Initial dischargeability | | A | A | A | A | A |
| | After-Standby-dischargeability | | A | A | A | A | A |
| | Blocking resistance | | A | A | A | A | A |
| | Laminate strength: PET/CPP | | AA | AA | AA | AA | AA |
| | Laminate strength: OPP/CPP | | A | A | A | A | A |
| | Drying properties | | A | A | A | A | A |

|  |  |  | Example 25 | Example 26 | Example 27 | Example 28 |
|---|---|---|---|---|---|---|
|  | Aqueous inkjet ink No. | | Ink 25 | Ink 26 | Ink 27 | Ink 28 |
| Pigment dispersion (Pigment density 15%) | Pigment dispersion | | Cyan 1 | Cyan 1 | Cyan 1 | Cyan 1 |
| | Amount | | 30 | 30 | 30 | 30 |
| | Binder resin | | Resin 25 | Resin 26 | Resin 27 | Resin 28 |
| | Amount (Solid fraction equivalent) | | 7 | 7 | 7 | 7 |
| Water-soluble organic solvent | Water-soluble organic solvent (B) | 1,2PD | 25 | 25 | 25 | 25 |
| Surfactant | Siloxane-based | TEGO WET 280 | 1.5 | 1.5 | 1.5 | 1.5 |
| | Acetylene-based | Surfinol 465 | 1 | 1 | 1 | 1 |
| Water | | | Rest | Rest | Rest | Rest |
| Evaluation result | Initial dischargeability | | A | A | A | A |
| | After-Standby-dischargeability | | A | A | A | A |
| | Blocking resistance | | A | A | A | A |
| | Laminate strength: PET/CPP | | AA | AA | AA | AA |
| | Laminate strength: OPP/CPP | | AA | AA | AA | AA |
| | Drying properties | | A | A | A | A |

|  |  | Example 29 | Example 30 | Example 31 | Example 32 | Example 33 |
|---|---|---|---|---|---|---|
| Aqueous inkjet ink No. | | Ink 29 | Ink 30 | Ink 31 | Ink 32 | Ink 33 |
| Pigment dispersion (Pigment density 15%) | Pigment dispersion | Cyan 1 | Cyan 1 | Cyan 1 | Cyan 1 | Cyan 1 |
| | Amount | 30 | 30 | 30 | 30 | 30 |

TABLE 4-continued

|  |  |  | | | | | |
|---|---|---|---|---|---|---|---|
| Binder resin | Binder resin | | Resin 29 | Resin 30 | Resin 31 | Resin 32 | Resin 33 |
| | Amount (Solid fraction equivalent) | | 7 | 7 | 7 | 7 | 7 |
| Water-soluble organic solvent | Water-soluble organic solvent (B) | 1,2PD | 25 | 25 | 25 | 25 | 25 |
| Surfactant | Siloxane-based | TEGO WET 280 | 1.5 | 1.5 | 1.5 | 1.5 | 1.5 |
| | Acetylene-based | Surfinol 465 | 1 | 1 | 1 | 1 | 1 |
| Water | | | Rest | Rest | Rest | Rest | Rest |
| Evaluation result | Initial dischargeability | | A | A | B | A | B |
| | After-Standby-dischargeability | | AA | AA | A | AA | AA |
| | Blocking resistance | | A | A | B | A | A |
| | Laminate strength: PET/CPP | | AAA | AAA | AAA | AAA | AAA |
| | Laminate strength: OPP/CPP | | AAA | AAA | AAA | AAA | AAA |
| | Drying properties | | A | A | A | A | A |

| | | | Example 34 | Example 35 | Example 36 | Example 37 |
|---|---|---|---|---|---|---|
| Aqueous inkjet ink No. | | | Ink 34 | Ink 35 | Ink 36 | Ink 37 |
| Pigment dispersion (Pigment density 15%) | Pigment dispersion | | Cyan 1 | Cyan 1 | Cyan 1 | Cyan 1 |
| | Amount | | 30 | 30 | 30 | 30 |
| Binder resin | Binder resin | | Resin 34 | Resin 35 | Resin 36 | Resin 37 |
| | Amount (Solid fraction equivalent) | | 7 | 7 | 7 | 7 |
| Water-soluble organic solvent | Water-soluble organic solvent (B) | 1,2PD | 25 | 25 | 25 | 25 |
| Surfactant | Siloxane-based | TEGO WET 280 | 1.5 | 1.5 | 1.5 | 1.5 |
| | Acetylene-based | Surfinol 465 | 1 | 1 | 1 | 1 |
| Water | | | Rest | Rest | Rest | Rest |
| Evaluation result | Initial dischargeability | | B | A | A | A |
| | After-Standby-dischargeability | | A | AA | AA | AA |
| | Blocking resistance | | B | A | A | A |
| | Laminate strength: PET/CPP | | AAA | AAA | AAA | AAA |
| | Laminate strength: OPP/CPP | | AAA | AAA | AAA | AAA |
| | Drying properties | | A | A | A | A |

| | | | Comparative Example 1 | Comparative Example 2 | Comparative Example 3 | Comparative Example 4 | Comparative Example 5 | Comparative Example 6 |
|---|---|---|---|---|---|---|---|---|
| Aqueous inkjet ink No. | | | Ink 55 | Ink 56 | Ink 57 | Ink 58 | Ink 59 | Ink 60 |
| Pigment dispersion (Pigment density 15%) | Pigment dispersion | | Cyan 1 | Cyan 1 | Cyan 1 | Cyan 1 | Cyan 1 | Cyan 1 |
| | Amount | | 30 | 30 | 30 | 30 | 30 | 30 |
| Binder resin | Binder resin | | Resin 38 | Resin 39 | Resin 40 | Resin 41 | Resin 43 | Resin 44 |
| | Amount (Solid fraction equivalent) | | 7 | 7 | 7 | 7 | 7 | 7 |
| Water-soluble organic solvent | Water-soluble organic solvent (B) | 1,2PD | 25 | 25 | 25 | 25 | 25 | 25 |
| Surfactant | Siloxane-based | TEGO WET 280 | 1.5 | 1.5 | 1.5 | 1.5 | 1.5 | 1.5 |
| | Acetylene-based | Surfinol 465 | 1 | 1 | 1 | 1 | 1 | 1 |
| Water | | | Rest | Rest | Rest | Rest | Rest | Rest |
| Evaluation result | Initial dischargeability | | A | C | A | B | A | A |
| | After-Standby-dischargeability | | A | D | A | B | B | C |
| | Blocking resistance | | D | B | B | D | D | A |
| | Laminate strength: PET/CPP | | C | A | C | C | C | D |
| | Laminate strength: OPP/CPP | | C | A | C | C | C | D |
| | Drying properties | | A | C | D | A | B | A |

| | | | Comparative Example 7 | Comparative Example 8 | Comparative Example 9 | Comparative Example 10 | Comparative Example 11 |
|---|---|---|---|---|---|---|---|
| Aqueous inkjet ink No. | | | Ink 61 | Ink 62 | Ink 63 | Ink 64 | Ink 65 |
| Pigment dispersion (Pigment density 15%) | Pigment dispersion | | Cyan 1 | Cyan 1 | Cyan 1 | Cyan 1 | Cyan 1 |
| | Amount | | 30 | 30 | 30 | 30 | 30 |
| Binder resin | Binder resin | | Resin 45 | Resin 46 | Resin 47 | Resin 48 | Resin 49 |
| | Amount (Solid fraction equivalent) | | 7 | 7 | 7 | 7 | 7 |
| Water-soluble organic solvent | Water-soluble organic solvent (B) | 1,2PD | 25 | 25 | 25 | 25 | 25 |
| Surfactant | Siloxane-based | TEGO WET 280 | 1.5 | 1.5 | 1.5 | 1.5 | 1.5 |
| | Acetylene-based | Surfinol 465 | 1 | 1 | 1 | 1 | 1 |
| Water | | | Rest | Rest | Rest | Rest | Rest |
| Evaluation result | Initial dischargeability | | A | C | A | A | B |
| | After-Standby-dischargeability | | C | B | C | D | D |
| | Blocking resistance | | A | D | A | D | A |

TABLE 4-continued

|  |  |  |  |  |  |
|---|---|---|---|---|---|
| Laminate strength: PET/CPP | D | C | D | A | C |
| Laminate strength: OPP/CPP | D | C | D | A | D |
| Drying properties | A | C | A | D | D |

TABLE 5

|  |  |  | Example 38 | Example 39 | Example 40 | Example 41 | Example 42 |
|---|---|---|---|---|---|---|---|
| Aqueous inkjet ink No. |  |  | Ink 38 | Ink 39 | Ink 40 | Ink 41 | Ink 42 |
| Pigment dispersion (Pigment density 15%) | Pigment dispersion | | Cyan 1 | Magenta 1 | Cyan 1 | Cyan 1 | Cyan 1 |
| | Amount | | 30 | 30 | 30 | 30 | 30 |
| Binder resin | Binder resin | | Resin 29 | Resin 29 | Resin 29 | Resin 29 | Resin 29 |
| | Amount (Solid fraction equivalent) | | 7 | 7 | 7 | 7 | 7 |
| Water-soluble organic solvent | Water-soluble organic solvent (B) | 1,2PD (boiling point 188° C., SP value: 12.6(cal/cm$^3$)$^{1/2}$) | 15 | 15 | 15 | 15 | 15 |
| | | 1,2BD (boiling point 194° C., SP value: 11.5(cal/cm$^3$)$^{1/2}$) | | | | | |
| | | MFG (boiling point 121° C., SP value: 9.5(cal/cm$^3$)$^{1/2}$) | 10 | 10 | 10 | 10 | |
| | | EFG (boiling point 133° C., SP value: 9.0(cal/cm$^3$)$^{1/2}$) | | | | | 10 |
| | | PFG (boiling point 150° C., SP value: 8.5(cal/cm$^3$)$^{1/2}$) | | | | | |
| | | MDFG (boiling point 188° C., SP value: 8.7(cal/cm$^3$)$^{1/2}$) | | | | | |
| | | MB (boiling point 161° C., SP value: 9.6(cal/cm$^3$)$^{1/2}$) | | | | | |
| | | BDG (boiling point 231° C., SP value: 8.9(cal/cm$^3$)$^{1/2}$) | | | | | |
| | | DEG (boiling point 244° C., SP value: 12.2(cal/cm$^3$)$^{1/2}$) | | | | | |
| | Water-soluble organic solvent that is not Water-soluble organic solvent (B) | glycerol (boiling point 290° C., SP value: 14.9(cal/cm$^3$)$^{1/2}$) | | | | | |
| | | DEDG (boiling point 188° C., SP value: 8.1(cal/cm$^3$)$^{1/2}$) | | | | | |
| | | 1.3PD (boiling point 214° C., SP value: 13.3(cal/cm$^3$)$^{1/2}$) | | | | | |
| Surfactant | Siloxane-based | TEGO WET 280 | 1.5 | 1.5 | 2.5 | 1.5 | 1.5 |
| | Acetylene-based | Surfinol 465 | 1 | 1 | 1 | 2.5 | 1 |
| Water | | | Rest | Rest | Rest | Rest | Rest |
| Evaluation result | Initial dischargeability | | AA | AA | A | A | AA |
| | After-Standby-dischargeability | | AA | AA | AA | AA | A |
| | Blocking resistance | | AA | AA | AA | AA | AA |
| | Laminate strength: PET/CPP | | AAA | AAA | AA | AAA | AAA |
| | Laminate strength: OPP/CPP | | AAA | AAA | AA | AAA | AAA |
| | Drying properties | | AA | AA | AA | AA | AA |

|  |  |  | Example 43 | Example 44 | Example 45 | Example 46 |
|---|---|---|---|---|---|---|
| Aqueous inkjet ink No. |  |  | Ink 43 | Ink 44 | Ink 45 | Ink 46 |
| Pigment dispersion (Pigment density 15%) | Pigment dispersion | | Cyan 1 | Cyan 1 | Cyan 1 | Cyan 1 |
| | Amount | | 30 | 30 | 30 | 30 |
| Binder resin | Binder resin | | Resin 29 | Resin 29 | Resin 29 | Resin 29 |
| | Amount (Solid fraction equivalent) | | 7 | 7 | 7 | 7 |
| Water-soluble organic solvent | Water-soluble organic solvent (B) | 1,2PD (boiling point 188° C., SP value: 12.6(cal/cm$^3$)$^{1/2}$) | 15 | 15 | 15 | 15 |
| | | 1,2BD (boiling point 194° C., SP value: 11.5(cal/cm$^3$)$^{1/2}$) | | | | |
| | | MFG (boiling point 121° C., SP value: 9.5(cal/cm$^3$)$^{1/2}$) | | | | |
| | | EFG (boiling point 133° C., SP value: 9.0(cal/cm$^3$)$^{1/2}$) | | | | |
| | | PFG (boiling point 150° C., SP value: 8.5(cal/cm$^3$)$^{1/2}$) | 10 | | | |
| | | MDFG (boiling point 188° C., SP value: 8.7(cal/cm$^3$)$^{1/2}$) | | 10 | | |
| | | MB (boiling point 161° C., SP value: 9.6(cal/cm$^3$)$^{1/2}$) | | | 10 | |

TABLE 5-continued

|  |  |  |  |  |  |  |  |
|---|---|---|---|---|---|---|---|
|  |  |  | BDG (boiling point 231° C., SP value: 8.9(cal/cm³)^(1/2)) |  |  |  | 10 |
|  |  |  | DEG (boiling point 244° C., SP value: 12.2(cal/cm³)^(1/2)) |  |  |  |  |
|  |  | Water-soluble organic solvent that is not Water-soluble organic solvent (B) | glycerol (boiling point 290° C., SP value: 14.9(cal/cm³)^(1/2)) |  |  |  |  |
|  |  |  | DEDG (boiling point 188° C., SP value: 8.1(cal/cm³)^(1/2)) |  |  |  |  |
|  |  |  | 1.3PD (boiling point 214° C., SP value: 13.3(cal/cm³)^(1/2)) |  |  |  |  |
|  | Surfactant | Siloxane-based | TEGO WET 280 | 1.5 | 1.5 | 1.5 | 1.5 |
|  |  | Acetylene-based | Surfinol 465 | 1 | 1 | 1 | 1 |
|  | Water |  |  | Rest | Rest | Rest | Rest |
|  | Evaluation result | Initial dischargeability |  | AA | AA | A | A |
|  |  | After-Standby-dischargeability |  | A | A | A | A |
|  |  | Blocking resistance |  | AA | AA | AA | AA |
|  |  | Laminate strength: PET/CPP |  | AAA | AAA | AAA | AAA |
|  |  | Laminate strength: OPP/CPP |  | AAA | AAA | AAA | AAA |
|  |  | Drying properties |  | AA | AA | AA | A |

|  |  |  |  | Example 47 | Example 48 | Example 49 | Example 50 |
|---|---|---|---|---|---|---|---|
|  | Aqueous inkjet ink No. |  |  | Ink 47 | Ink 48 | Ink 49 | Ink 50 |
| Pigment dispersion (Pigment density 15%) | Pigment dispersion |  |  | Cyan 1 | Cyan 1 | Cyan 1 | Cyan 1 |
|  | Amount |  |  | 30 | 30 | 30 | 30 |
| Binder resin | Binder resin |  |  | Resin 29 | Resin 29 | Resin 29 | Resin 29 |
|  | Amount (Solid fraction equivalent) |  |  | 7 | 7 | 7 | 7 |
| Water-soluble organic solvent | Water-soluble organic solvent (B) | 1,2PD (boiling point 188° C., SP value: 12.6(cal/cm³)^(1/2)) |  |  | 15 | 35 | 3 |
|  |  | 1,2BD (boiling point 194° C., SP value: 11.5(cal/cm³)^(1/2)) |  | 15 |  |  |  |
|  |  | MFG (boiling point 121° C., SP value: 9.5(cal/cm³)^(1/2)) |  | 10 |  | 3 | 10 |
|  |  | EFG (boiling point 133° C., SP value: 9.0(cal/cm³)^(1/2)) |  |  |  |  |  |
|  |  | PFG (boiling point 150° C., SP value: 8.5(cal/cm³)^(1/2)) |  |  |  |  |  |
|  |  | MDFG (boiling point 188° C., SP value: 8.7(cal/cm³)^(1/2)) |  |  |  |  |  |
|  |  | MB (boiling point 161° C., SP value: 9.6(cal/cm³)^(1/2)) |  |  |  |  |  |
|  |  | BDG (boiling point 231° C., SP value: 8.9(cal/cm³)^(1/2)) |  |  |  |  |  |
|  |  | DEG (boiling point 244° C., SP value: 12.2(cal/cm³)^(1/2)) |  |  |  |  |  |
|  | Water-soluble organic solvent that is not Water-soluble organic solvent (B) | glycerol (boiling point 290° C., SP value: 14.9(cal/cm³)^(1/2)) |  |  |  |  |  |
|  |  | DEDG (boiling point 188° C., SP value: 8.1 (cal/cm³)^(1/2)) |  |  |  |  |  |
|  |  | 1.3PD (boiling point 214° C., SP value: 13.3(cal/cm³)^(1/2)) |  |  |  | 10 |  |
| Surfactant | Siloxane-based | TEGO WET 280 |  | 1.5 | 1.5 | 1.5 | 1.5 |
|  | Acetylene-based | Surfinol 465 |  | 1 | 1 | 1 | 1 |
| Water |  |  |  | Rest | Rest | Rest | Rest |
| Evaluation result | Initial dischargeability |  |  | AA | A | A | A |
|  | After-Standby-dischargeability |  |  | AA | AA | AA | A |
|  | Blocking resistance |  |  | AA | A | A | AA |
|  | Laminate strength: PET/CPP |  |  | AAA | AAA | AAA | AAA |
|  | Laminate strength: OPP/CPP |  |  | AAA | AAA | AAA | AAA |
|  | Drying properties |  |  | AA | A | A | AA |

|  |  |  |  | Example 51 | Example 52 | Example 53 | Example 54 |
|---|---|---|---|---|---|---|---|
|  | Aqueous inkjet ink No. |  |  | Ink 51 | Ink 52 | Ink 53 | Ink 54 |
| Pigment dispersion (Pigment density 15%) | Pigment dispersion |  |  | Cyan 1 | Cyan 1 | Cyan 1 | Cyan 1 |
|  | Amount |  |  | 30 | 30 | 30 | 30 |
| Binder resin | Binder resin |  |  | Resin 29 | Resin 29 | Resin 29 | Resin 29 |
|  | Amount (Solid fraction equivalent) |  |  | 7 | 7 | 7 | 7 |
| Water-soluble organic solvent | Water-soluble organic solvent (B) | 1,2PD (boiling point 188° C., SP value: 12.6(cal/cm³)^(1/2)) |  |  | 15 | 10 | 10 |
|  |  | 1,2BD (boiling point 194° C., SP value: 11.5(cal/cm³)^(1/2)) |  |  |  |  |  |

TABLE 5-continued

| | | | | | | | |
|---|---|---|---|---|---|---|---|
| | | MFG (boiling point 121° C., SP value: 9.5(cal/cm³)^(1/2)) | 15 | 10 | 10 | 10 | |
| | | EFG (boiling point 133° C., SP value: 9.0(cal/cm³)^(1/2)) | | | | | |
| | | PFG (boiling point 150° C., SP value: 8.5(cal/cm³)^(1/2)) | | | | | |
| | | MDFG (boiling point 188° C., SP value: 8.7(cal/cm³)^(1/2)) | | | | | |
| | | MB (boiling point 161° C., SP value: 9.6(cal/cm³)^(1/2)) | 10 | | | | |
| | | BDG (boiling point 231° C., SP value: 8.9(cal/cm³)^(1/2)) | | | | | |
| | | DEG (boiling point 244° C., SP value: 12.2(cal/cm³)^(1/2)) | | 0.5 | 4 | | |
| | Water-soluble organic solvent that is not Water-soluble organic solvent (B) | glycerol (boiling point 290° C., SP value: 14.9(cal/cm³)^(1/2)) | | | | 4 | |
| | | DEDG (boiling point 188° C., SP value: 8.1 (cal/cm³)^(1/2)) | | | | | |
| | | 1,3PD (boiling point 214° C., SP value: 13.3(cal/cm³)^(1/2)) | | | | | |
| Surfactant | Siloxane-based | TEGO WET 280 | 1.5 | 1.5 | 1.5 | 1.5 | |
| | Acetylene-based | Surfinol 465 | 1 | 1 | 1 | 1 | |
| Water | | | Rest | Rest | Rest | Rest | |
| Evaluation result | Initial dischargeability | | AA | AA | AA | AA | |
| | After-Standby-dischargeability | | B | AA | AA | AA | |
| | Blocking resistance | | AA | AA | AA | AA | |
| | Laminate strength: PET/CPP | | AAA | AAA | AAA | AAA | |
| | Laminate strength: OPP/CPP | | AAA | AAA | AAA | AAA | |
| | Drying properties | | AA | AA | A | A | |

| | | | Comparative Example 12 | Comparative Example 13 | Comparative Example 14 | Comparative Example 1 5 | Comparative Example 16 |
|---|---|---|---|---|---|---|---|
| Aqueous inkjet ink No. | | | Ink 66 | Ink 67 | Ink 68 | Ink 69 | Ink 70 |
| Pigment dispersion (Pigment density 15%) | Pigment dispersion | | Cyan 1 | Magenta 1 | Cyan 1 | Cyan 1 | Cyan 1 |
| | Amount | | 30 | 30 | 30 | 30 | 30 |
| Binder resin | Binder resin | | Resin 45 | Resin 45 | Resin 29 | Resin 29 | Resin 29 |
| | Amount (Solid fraction equivalent) | | 7 | 7 | 7 | 7 | 7 |
| Water-soluble organic solvent | Water-soluble organic solvent (B) | 1,2PD (boiling point 188° C., SP value: 12.6(cal/cm³)^(1/2)) | 15 | 15 | | | 10 |
| | | 1,2BD (boiling point 194° C., SP value: 11.5(cal/cm³)^(1/2)) | | | | | |
| | | MFG (boiling point 121° C., SP value: 9.5(cal/cm³)^(1/2)) | 10 | 10 | | | 7 |
| | | EFG (boiling point 133° C., SP value: 9.0(cal/cm³)^(1/2)) | | | | | |
| | | PFG (boiling point 150° C., SP value: 8.5(cal/cm³)^(1/2)) | | | | | |
| | | MDFG (boiling point 188° C., SP value: 8.7(cal/cm³)^(1/2)) | | | | | |
| | | MB (boiling point 161° C., SP value: 9.6(cal/cm³)^(1/2)) | | | | | |
| | | BDG (boiling point 231° C., SP value: 8.9(cal/cm³)^(1/2)) | | | | | |
| | | DEG (boiling point 244° C., SP value: 12.2(cal/cm³)^(1/2)) | | | | | 7 |
| | Water-soluble organic solvent that is not Water-soluble organic solvent (B) | glycerol (boiling point 290° C., SP value: 14.9(cal/cm³)^(1/2)) | | | | | |
| | | DEDG (boiling point 188° C., SP value: 8.1(cal/cm³)^(1/2)) | | | 25 | | |
| | | 1,3PD (boiling point 214° C., SP value: 13.3(cal/cm³)^(1/2)) | | | | 25 | |
| Surfactant | Siloxane-based | TEGO WET 280 | 1.5 | 1.5 | 1.5 | 1.5 | 1.5 |
| | Acetylene-based | Surfinol 465 | 1 | 1 | 1 | 1 | 1 |
| Water | | | Rest | Rest | Rest | Rest | Rest |
| Evaluation result | Initial dischargeability | | A | A | C | C | A |
| | After-Standby-dischargeability | | C | C | D | C | A |
| | Blocking resistance | | A | A | C | C | C |
| | Laminate strength: PET/CPP | | D | D | A | B | C |
| | Laminate strength: OPP/CPP | | D | D | A | B | C |
| | Drying properties | | A | A | A | D | C |

<Production Examples of the ink sets of Example 55 and Comparative Example 17>

A combination of the ink 38 and the ink 39 produced above were used to form the ink set of Example 55. A combination of the ink 66 and the ink 67 were used to form the ink set of Comparative Example 17. Printing using the cyan ink (the ink 38 or 66) with a printing ratio of 100% was performed, and, thereafter, without any drying process, printing using the magenta ink (the ink 39 or 67) with a printing ratio of 100% was performed, thus obtaining a printed matter of multiple layer printing, which was used for evaluation described below.

TABLE 6

|  |  | Example 55 | Comparative Example 17 |
|---|---|---|---|
| Aqueous inkjet ink set | Cyan ink (Printed first) | Ink 38 | Ink 66 |
|  | Magenta ink (Printed later) | Ink 39 | Ink 67 |
| Evaluation result | Blocking resistance | AA | B |
|  | Laminate strength: PET/CPP | AAA | D |
|  | Laminate strength: OPP/CPP | AAA | D |

The abbreviations used in Tables 4 to 6 have the following meanings.

1,2-PD: 1,2-propanediol
(boiling point: 188° C., SP value: 12.6 $(cal/cm^3)^{1/2}$)
1,2BD: 1,2-butanediol
(boiling point: 194° C., SP value: 11.5 $(cal/cm^3)^{1/2}$)
MFG: propylene glycol monomethyl ether
(boiling point: 121° C., SP value: 9.5 $(cal/cm^3)^{1/2}$)
EFG: propylene glycol monoethyl ether
(boiling point: 133° C., SP value: 9.0 $(cal/cm^3)^{1/2}$)
PFG: propylene glycol monopropyl ether
(boiling point: 150° C., SP value: 8.5 $(cal/cm^3)^{1/2}$)
MDFG: dipropylene glycol monomethyl ether
(boiling point: 188° C., SP value: 8.7 $(cal/cm^3)^{1/2}$)
MB: 3-methoxybutanol
(boiling point: 161° C., SP value: 9.6 $(cal/cm^3)^{1/2}$)
BDG: diethylene glycol monobutyl ether
(boiling point: 231° C., SP value: 8.9 $(cal/cm^3)^{1/2}$)
DEG: diethylene glycol
(boiling point: 244° C., SP value: 12.2 $(cal/cm^3)^{1/2}$)
glycerol
(boiling point: 290° C., SP value: 14.9 $(cal/cm^3)^{1/2}$)
DEDG: diethylene glycol diethyl ether
(boiling point: 188° C., SP value: 8.1 $(cal/cm^3)^{1/2}$)
1,3PD: 1,3-propanediol
(boiling point: 214° C., SP value: 13.3 $(cal/cm^3)^{1/2}$)

<Example 1 to 55, Comparative Example 1 to 17: Evaluations of Ink and Ink Set>

The following evaluations were carried out on the produced inks and ink sets. The evaluation results are shown in Tables 4 to 6.

<Evaluation 1: Initial Dischargeability>

Each ink was charged in an inkjet discharge apparatus fitted with a head (KJ4B-1200) manufactured by Kyocera Corporation. A nozzle check pattern was printed, and following confirmation that ink discharge had occurred normally from all of the nozzles, the apparatus was left for 1 minute in an environment of 25° C., and then solid printing with a printing ratio of 100% was performed under printing conditions including a frequency of 40 kHz and 1200×1200 dpi. The initial dischargeability was evaluated by visually checking and by checking with a loupe whether the portion at which the 100% solid printing had started was printed. The evaluation criteria are as follows, with evaluations AA, A, and B representing practically usable levels.

A PET film (FE 2001, 12 μm thick) manufactured by Futamura Chemical Co., Ltd. was used as the non-absorption substrate.

AA: both the visual checking and the checking with a loupe confirmed that there was absolutely no unprinted part at the portion at which the printing had started, and thus initial ink had actually discharged A: no unprinted part was found by visual checking, but an unprinted part of less than 1 mm was found by checking with a loupe B: an unprinted part of 1 mm to less than 5 mm was found by visual checking, at the portion at which the printing had started C: an unprinted part of at least 5 mm was found by visual checking, at the portion at which the printing had started, and thus misfires occurred at the portion at which the printing had started <Evaluation 2: After-Standby-Dischargeability>

Using the same printing conditions and the same substrate as in the Evaluation 1, solid printing with a printing ratio of 100% was performed. After printing, the inkjet discharge apparatus was placed in a standby state for a certain period of time in an environment of 25° C., and then the nozzle check pattern was printed, and an intermittent dischargeability was evaluated by visually checking whether any nozzle misfires. The evaluation criteria are as follows, with evaluations AA, A, and B representing practically usable levels.

AA: even when printing was performed after 3 hours of standby period, absolutely no nozzle misfires occurred A: when printing was performed after 2 hours of standby period, absolutely no nozzle misfires occurred, but when printing was performed after 3 hours of standby period, some nozzle misfires occurred B: when printing was performed after 1 hour of standby period, absolutely no nozzle misfires occurred, but when printing was performed after 2 hours of standby period, some misfires occurred C: when printing was performed after 1 hour of standby period, 1 to 9 nozzle misfires occurred D: when printing was performed after 1 hour of standby period, at least 10 nozzle misfires occurred <Evaluation 3: Blocking Resistance>

Under the same printing conditions and the same substrate as in the Evaluation 1 above, solid printing with a printing ratio of 100% was performed, and the printed matter was dried for 1 minute using an air oven at 85° C. The printed matter was cut into a 4 cm×4 cm square and overlaid on the rear surface of the PET film which is a non-printing surface of the PET film used for printing, and a blocking test was performed using a permanent strain tester. The environmental conditions during the blocking test include a load of 10 $kg/cm^2$, a temperature of 40° C., humidity of 80% RH, and a test period of 24 hours. After 24 hours had past, the stacked PET films were pulled apart instantaneously with an angle of 90°, and the blocking resistance was evaluated by visually checking the peeled PET film. The evaluation criteria are as follows, with AA, A, and B evaluations representing practically usable levels. Example 55 and Comparative Example 17 are the results of multiple layer printing in which a cyan ink was printed with a printing ratio of 100%, and thereafter, without any drying process, a magenta ink was printed with a printing ratio of 100%.

A constant load type permanent strain tester manufactured by Tester Sangyo Co., Ltd. was used for the loading on the printed matter.

AA: there was no transfer of the printing layer to the PET film, and there was no peeling resistance A: there was no transfer of the printing layer to the PET film, but there was a slight resistance at the time of peeling B: the transfer of the printing layer to the PET film was within 10% of the total area.

C: the transfer of the printing layer to the PET film was within 30% of the total area D: the transfer of the printing layer to the PET film exceeded 30% of the total area <Evaluation 4: Evaluation of Laminate Strength (Adhesive Force)>

Under the same printing conditions as described in Evaluation 1 above, solid printing with a printing ratio of 100% was performed using the non-absorption substrate described below, and after printing, the printed matter was dried for 1 minute using an air oven at 85° C. A solvent-free test coater was used to apply a solvent-free laminate adhesive (EA-N 373A/B, manufactured by Toyo-Morton, Ltd.) to the printed surface of the produced printed matter at a temperature of 60° C. and a coating speed of 50 m/min (coating amount: 2 g/m²). Further, the corona treated surface of the CPP film (cast polypropylene film "FHK2, 25 µm thick", manufactured by Futamura Chemical Co., Ltd.) was overlaid on the surface having the laminate adhesive coated thereon, and then the resulting product was aged at 40° C. and 80% RH for 1 day to cure the solvent-free laminate adhesive composition, thus producing a laminate. The resulting laminate was cut to a length of 300 mm and a width of 15 mm, which was used as a test piece. Using an Instron type tensile testing machine, a tensile strength (N) of the T-type peeling was measured at a peeling speed of 300 mm/minute under an environment at 25° C. This test was performed five times, and the average value was obtained to evaluate the adhesive strength.

A PET film (FE 2001, 12 µm thick) manufactured by Futamura Chemical Co., Ltd. and an OPP film (FOR-AQ, 20 µm thick) manufactured by Futamura Chemical Co., Ltd. were used as non-absorption substrates. The PET/CPP and OPP/CPP shown in Tables 4 to 6 represent the film composition of the laminate, and represent "print substrate/film bonded using laminate adhesive". Evaluation criteria are as follows, with AAA, AA, A, and B representing practically usable levels. Examples 55 and Comparative 17 are the results of a multiple layer printing in which a cyan ink was printed with a printing ratio of 100%, and thereafter, without any drying process, a magenta ink was printed with a printing ratio of 100%.

AAA: adhesive force 2.0 N or more

AA: adhesive force: 1.5 N or more, less than 2.0 N

A: adhesive force 1.0 N or more, less than 1.5 N

B: adhesive force 0.6 N or more, less than 1.0 N

C: adhesive force 0.3 N or more, less than 0.6 N

D: adhesive force less than 0.3 N

<Evaluation 5: Evaluation of Drying Properties>

Using the same printing conditions and the same substrate as the Evaluation 1, solid printing with a printing ratio of 100% was performed. After printing, the printed matter was placed in an air oven at 85° C., taken out at regular intervals, and the drying properties were evaluated by touching the printed matter with the finger. The evaluation criteria are as follows, with AA, A, and B evaluations representing practically usable levels.

AA: when touched with a finger after 10 seconds of drying time, there was no tackiness (sticky sensation) and the coating film was dry A: when touched with a finger after 20 seconds of drying time, there was no tackiness and the coating film was dry, but after 10 seconds of drying time, the coating film was not dry B: when touched with a finger after 30 seconds of drying time, there was no tackiness and the coating film was dry, but after 20 seconds of drying time, the coating film was not dry C: when touched with a finger after 40 seconds of drying time, there was no tackiness and the coating film was dry, but after 30 seconds of drying time, the coating film was not dry D: when touched with a finger even after 40 seconds of drying time, there was a tackiess, and the coating film was not dry The ink of Examples 1 to 55 each contain a combination of a suitable binder resin and a water-soluble organic solvent, and showed good results in each of the evaluations.

In Comparative Example 1, the weight average molecular weight of the binder resin contained in the aqueous ink was 4,200, and the blocking resistance and the laminate strength were poor due to insufficient cohesion of the printed coating film. In Comparative Example 2, the weight average molecular weight of the binder resin was 57,000, and adhesion and precipitation occurred on the inkjet nozzles, resulting in poor discharge properties. In addition, solvent separation during drying was poor, resulting in poor drying properties. In Comparative Example 3, the Tg of the binder resin was 117° C., and the flexibility of the ink coating film was poor and the laminate strength was poor. Further, volatilization of the water-soluble organic solvent from the ink coating film during drying is slow, resulting in poor drying properties. In Comparative Example 4, the Tg of the binder resin was low, and the blocking resistance was poor. In addition, it resulted in excessive flexibility and poor laminate strength. In Comparative Example 5, since there is no acid group in the binder resin, the cohesive force of the ink coating film is poor, resulting in poor blocking resistance and laminate strength. In Comparative Examples 6, 7, 9, 12, and 13, since the binder resin has no hydroxyl group, the binder resin tends to adhere on the inkjet nozzles when combined with a water-soluble organic solvent, resulting in poor after-standby-discharge. In addition, the crosslinking with the laminate adhesive and hydrogen bonding strength were inferior, resulted in poor laminate strength. In Comparative Example 8, a binder resin produced with reference to Reference Example 4 of Patent Document 1 was used, but the weight-average molecular weight was 47,000 and the Tg was 12° C., and for the same reasons as described above, the drying properties, the blocking resistance and the laminate strength were all poor. Since the liquids containing the binder resin used in Comparative Examples 10 and 11 are an aqueous dispersions, they do not belong to an aqueous resin. In both of these comparative examples, the weight average molecular weight was large, and adhesion on the inkjet nozzles occurred, resulting in poor after-standby-dischargeability. Further, since the solvent molecules are hard to volatilize from the ink coating film, the drying properties is poor. In addition, in Comparative Example 10, since the Tg is low, the flexibility of the ink coating film becomes excessive, resulting in poor blocking resistance. On the other hand, in Comparative Example 11, since the flexibility in the ink coating film is poor and the movement of the binder resin chain is restricted, the interaction between the hydroxyl group of the binder resin and the laminate adhesive is poor at the time of laminating, resulting in poor laminate strength.

In Comparative Examples 14 and 15, the SP of the water-soluble organic solvent was 8.1 and 13.3 $(cal/cm^3)^{1/2}$, respectively, and the combination with the binder resin resulted in poor discharge stability. Comparative Example 16 contains 7.0% of a water-soluble organic solvent having a boiling point of 235° C. or higher, and showed poor drying properties, blocking resistance and laminate strength. Comparative Example 17 showed the results of a multiple layer printing of the ink 66 and ink 67 in which a binder resin that does not contain a hydroxyl group is used, and since the inks do not contain a hydroxyl group, the interaction with the laminate adhesive is poor, resulting in poor laminate strength.

The invention claimed is:

1. An aqueous inkjet ink comprising a pigment, a binder resin, a water-soluble organic solvent, a surfactant and water, wherein
   the binder resin comprises an aqueous resin containing, as structural units, a structure derived from an ethylenically unsaturated monomer containing an acid group and a structure derived from an ethylenically unsaturated monomer containing a hydroxyl group, wherein a hydroxyl value of the aqueous resin is from 1 to 50 mgKOH/g;
   the aqueous resin has a weight average molecular weight of 5,000 to 45,000, and a glass transition temperature of 35 to 110° C.;
   the water-soluble organic solvent comprises a first water-soluble organic solvent having an SP value of 8.5 to 13 $(cal/cm3)1/2$, and does not contain a second water-soluble organic solvent having a boiling point at 1 atmosphere of 235° C. or higher; and
   the surfactant contains an acetylene-based surfactant.

2. The aqueous inkjet ink according to claim 1, wherein the water-soluble organic solvent comprises a water-soluble organic solvent having a boiling point of 200° C. or lower in an amount of at least 60% by mass of a total mass of the water-soluble organic solvent.

3. An aqueous inkjet ink comprises a pigment, a binder resin, a water-soluble organic solvent, a surfactant and water, wherein
   the binder resin comprises an aqueous resin containing, as structural units, a structure derived from an ethylenically unsaturated monomer containing an acid group and a structure derived from an ethylenically unsaturated monomer containing a hydroxyl group, wherein a hydroxyl value of the aqueous resin is from 1 to 50 mgKOH/g;
   the aqueous resin has a weight average molecular weight of 5,000 to 45,000, and a glass transition temperature of 35 to 110° C.;
   the water-soluble organic solvent contains a first water-soluble organic solvent having an SP value of 8.5 to 13 $(cal/cm3)1/2$, and a second water-soluble organic solvent having a boiling point at 1 atmosphere of 235° C. or higher;
   an amount of the second water-soluble organic solvent is greater than 0% by mass but not more than 5% by mass relative to a total mass of the aqueous inkjet ink; and
   the surfactant comprises an acetylene-based surfactant.

4. The aqueous inkjet ink according to claim 1, wherein the first water-soluble organic solvent comprises at least one selected from the group consisting of 1,2-propanediol and 1,2-butanediol in an amount of 5 to 30% by mass relative to a total mass of the aqueous inkjet ink.

5. The aqueous inkjet ink according to claim 1, wherein the first water-soluble organic solvent comprises one or more propylene glycol ether-based solvents selected from the group consisting of propylene glycol monomethyl ether, propylene glycol monoethyl ether, propylene glycol monopropyl ether, propylene glycol monobutyl ether and dipropylene glycol monomethyl ether, in an amount of 1 to 15% by mass relative to a total mass of the aqueous inkjet ink.

6. The aqueous inkjet ink according to claim 1, wherein an acid value of the aqueous resin is from 10 to 60 mgKOH/g.

7. The aqueous inkjet ink according to claim 1, wherein a hydroxyl value of the aqueous resin is from 15 to 45 mgKOH/g.

8. An aqueous inkjet ink set comprising two or more aqueous inkjet inks having different hues from each other, wherein
   each of the two or more aqueous inkjet inks is the aqueous inkjet ink according to claim 1.

9. A method for producing an aqueous inkjet ink printed matter, the method having a step of discharging from an inkjet head and adhering to a substrate the aqueous inkjet ink according to claim 1, and a step of drying the substrate with the adhered aqueous inkjet ink.

10. A printed matter obtained by printing the aqueous inkjet ink according to a claim 1, or the aqueous inkjet ink set according to claim 8 onto a substrate.

11. The aqueous inkjet ink according to claim 3, wherein the first water-soluble organic solvent comprises at least one selected from the group consisting of 1,2-propanediol and 1,2-butanediol in an amount of 5 to 30% by mass relative to a total mass of the aqueous inkjet ink.

12. The aqueous inkjet ink according to claim 3, wherein the first water-soluble organic solvent comprises one or more propylene glycol ether-based solvents selected from the group consisting of propylene glycol monomethyl ether, propylene glycol monoethyl ether, propylene glycol monopropyl ether, propylene glycol monobutyl ether and dipropylene glycol monomethyl ether, in an amount of 1 to 15% by mass relative to a total mass of the aqueous inkjet ink.

13. The aqueous inkjet ink according to claim 3, wherein an acid value of the aqueous resin is from 10 to 60 mgKOH/g.

14. The aqueous inkjet ink according to claim 3, wherein a hydroxyl value of the aqueous resin is from 15 to 45 mgKOH/g.

15. An aqueous inkjet ink set comprising two or more aqueous inkjet inks having different hues from each other, wherein
   each of the two or more aqueous inkjet inks is the aqueous inkjet ink according to claim 3.

16. A method for producing an aqueous inkjet ink printed matter, the method having a step of discharging from an inkjet head and adhering to a substrate the aqueous inkjet ink according to claim 3, and a step of drying the substrate with the adhered aqueous inkjet ink.

17. A printed matter obtained by printing the aqueous inkjet ink according to a claim 3 onto a substrate.

* * * * *